(12) United States Patent
Jin et al.

(10) Patent No.: US 7,483,841 B1
(45) Date of Patent: Jan. 27, 2009

(54) PROJECT MANAGEMENT SYSTEM AND METHOD

(75) Inventors: Yan Jin, Arcadia, CA (US); John Kunz, Palo Alto, CA (US); Raymond Levitt, Stanford, CA (US); Marc Ramsey, Oakland, CA (US); Carlos Rivero, Key Biscayne, FL (US); Charles Thaeler, Novato, CA (US)

(73) Assignee: eProject Management, LLC, Austin, TX (US)

(*) Notice: Subject to any disclaimer, the term of this patent is extended or adjusted under 35 U.S.C. 154(b) by 1539 days.

(21) Appl. No.: 09/906,947

(22) Filed: Jul. 13, 2001

Related U.S. Application Data

(60) Provisional application No. 60/303,752, filed on Jul. 6, 2001.

(51) Int. Cl.
*G06F 17/60* (2006.01)
(52) U.S. Cl. .......................................................... 705/7
(58) Field of Classification Search .................. 705/7–8
See application file for complete search history.

(56) References Cited

U.S. PATENT DOCUMENTS

| | | | | |
|---|---|---|---|---|
| 6,308,164 | B1 * | 10/2001 | Nummelin et al. .............. | 705/9 |
| 6,591,278 | B1 * | 7/2003 | Ernst ....................... | 707/104.1 |
| 6,725,428 | B1 * | 4/2004 | Pareschi et al. ............. | 715/205 |
| 6,850,939 | B2 * | 2/2005 | Bostleman et al. ............. | 707/9 |
| 6,854,088 | B2 * | 2/2005 | Massengale et al. ........ | 715/764 |

FOREIGN PATENT DOCUMENTS

WO WO0116838 A2 * 3/2001

OTHER PUBLICATIONS

John "Software engineering project management, estimation and metrics: Discussion summary and recommendations"; Dec. 1996; University of Auckland, New Zealand; pp. 500-503.*

Daniel et al A Multi-Project Decision Process Simulation of Defense Contractor Behavior); Dec. 1980; IEEE; USAF Business Research Management Center; pp. 155-162.*

Anil et al "AP-Advance Project Planning Paradigm For Construction"; Dec. 1994, Department Of Engineering Technology Western Western Michigan University; pp. 1153-1158.*

Jaak Jurison "Software Project Management: The Manager's View"; Sep. 1999; Communications of the Association for Information Systems; pp. 1-57.*

Joyce "Matrix Organization: A Social Experiment"; Dec. 1996; Academy of Management Journal; pp. 536-5-61.*

(Continued)

*Primary Examiner*—Romain Jeanty
(74) *Attorney, Agent, or Firm*—Jackson Walker L.L.P.

(57) ABSTRACT

A program management structure that includes a plurality of projects, where each project is staffed with a project manager and wherein each project includes a plurality of tasks which can have multiple interdependencies and at least one position reporting up to the project manager. A plurality of organizations is also included, where each organization is provided with a plurality of departments, each of which has a department manager and at least one staffer reporting up to the department manager and filling at least part of the at least one position. Additionally, project exceptions are reported to the project manager and functional exceptions are reported to the functional manager.

15 Claims, 36 Drawing Sheets

OTHER PUBLICATIONS

Jin et al The Virtual Team: "A Computational Model of Project Orgasnizations", Mar. 1996, Department of Civil Engineering, Stafford Connecticut pp. 1-32.*

Levitt et al "Simulating Project Work Processes and Organizations to "Engineer" Strategic Processes", Feb. 17, 2000, Proceeding of ETCE/OMAE2000 Joint Conference: Energy for the new millenium, pp. 1-13.*

Lowery (Managing Projects with Microsoft Project 4.0), 1996.*

Levitt et al "Simulating Project Work Processes and Organizations: Toward a Micro-Cotingency Theory of Organization Design".*

Business Wire Vite Announces SimVision 3.5—Enhanced and Optimized for Consultants; Advanced Software Drives SimVision Consulting Solutions, Delivered by Vite and Its Partners), Oct. 2001, pp. 1-2.*

Business Wire "Vite Announces Enhanced Enterprise Project Management Solution; Vite SimVision Adds "Flight Test" Technology, Resource Allocation, Risk Assessment to Microsoft Project Solutions", Apr. 2001, pp. 1-3.*

Gert et al "Exceptions Handling in Petri-Net-based Workflow Management", Dec. 1996, pp. 1-15.*

Lars et al "Modeling and Simulating Coordination in Projects", Dec. 2000, Journal of Organizational Computing and ELectronic Commerce. pp. 33-55.*

Law "A forum on crucial issues in simulation modeling", May 1993, Industrial Engineering, V25, n5, Dialog file 75, Accession No. 00166631.*

Deininger et al (Teaching Software Project Management by Simulation-Experiences With a Comprehensive Model), Software Engineering Group, Dept. of Computer Science, pp. 1-16.*

Rodrigues (The role of system dynamics of project management), Aug. 1996, International Journal of Project Management, vol. 14, Issue 4, pp. 213-220.*

* cited by examiner

FIG. 2 PROJECTS WITHIN A PROGRAM

INDIVIDUAL PROJECT TASK DETAIL
(MISSING POSITIONS, MEETINGS)

"AN INDIVIDUAL FROM ANY DEPARTMENT CAN BE ASSIGNED TO ANY TASK OF ANY PROJECT."

| | Program | Name | Units |
|---|---|---|---|
| | Name | Program | |
| | Description | | |
| | Start Date | 10/18/2000 08:00 | |
| | Trials | 100 | |
| | Def Demand Interval | Calculated | |
| | Demand Interval | Calculated | |
| | Seed | 0 | |
| | Work Day | 8 | Hours |
| | Work Week | 5 | Days |
| | Team Experience | Medium | |
| | Centralization | Medium | |
| | Formalization | Medium | |
| | Matrix Strength | Medium | |
| | Info Exchange Prob. | 0 | |
| | Noise Prob. | 0 | |
| | Functional Error Prob. | 0 | |
| | Project Error Prob. | 0 | |
| | Behavior File | Default | |
| | Hyperlinks | Edit... | |

FIG. 6A

| Program | Value | Units |
|---|---|---|
| Name | Program | |
| Description | | |
| Start Date | 10/18/2000 08:00 | |
| Trials | 100 | |
| Det Demand Interval | Calculated | |
| Demand Internal | Calculated | |
| Seed | 0 | |
| Work Day | 8 | Hours |
| Work Week | 5 | Days |
| Team Experience | Medium | |
| Centralization | Medium | |
| Formalization | Medium | |
| Matrix Strength | Medium | |
| Info Exchange Prob. | 0 | |
| Noise Prob. | 0 | |
| Functional Error Prob. | 0 | |
| Project Error Prob. | 0 | |
| Behavior File | Default | |
| Hyperlinks | Edit... | |

FIG. 11

| Meeting | Value | Units |
|---|---|---|
| Name | Meeting1 | |
| Description | | |
| Priority | Medium | |
| Duration | 1 | Hours |
| Repeating | Yes | |
| Meet Every | 1 | Weeks |
| Start Time | 08:00 AM | |
| First Meeting | Ship | Relative |
| Start Lag | 0 | Days |
| Schedule till | Till End | |
| Last Meeting | Ship | Relative |
| End Lag | 0 | Days |
| Hyperlinks | Edit... | |

FIG. 12

| Milestone | Value | Units |
|---|---|---|
| Name | Milestone1 | |
| Description | | |
| Planned Date | Start | Relative |
| Lag | 0 | Days |
| Hyperlinks | Edit... | |

| Program | Value | Units |
|---|---|---|
| Name | Product Developme | |
| Description | | |
| Centralization | High ▽ | 🔓 |
| Formalization | Medium | 🔒 |
| Matrix Strength | Medium | 🔒 |
| Hyperlinks | Edit... | |

| Project | Value | Units |
|---|---|---|
| Name | Specification | |
| Description | | |
| Priority | Medium | |
| Work Day | 8 | 🔒 |
| Work Week | 6 | 🔒 |
| Team Experience | Medium | 🔒 |
| Centralization | Medium | 🔒 |
| Formalization | Medium | 🔒 |
| Matrix Strength | Medium | 🔒 |
| Info Exchange Prob. | 0 | 🔒 |
| Noise Prob. | 0 | 🔒 |
| Functional Error Prob. | 0 | 🔒 |
| Project Error Prob. | 0 | 🔒 |
| Hyperlinks | Edit... | |

FIG. 16

| | Task | Value | Units |
|---|---|---|---|
| | Name | Task1 | |
| | Description | | |
| 208 → | Priority | Medium | |
| 210 → | Work Volume | 5 | Days |
| 211 → | Skills | Generic | |
| | Requirement Complexity | Medium | |
| | Solution Complexity | Medium | |
| | Uncertainty | Medium | |
| | Fixed Cost | 0 | |
| | Hyperlinks | Edit... | |

| | Position | Value | Units |
|---|---|---|---|
| | Name | Foreman | |
| | Description | | |
| 214 → | Role | ST | |
| 216 → | Application Experience | Medium | |
| | FTE | 1 | |
| | Salary | 50 | curr/FTE/hr |
| | Skill Set | Edit... | |
| | Staffing | Edit... | |
| | Hyperlinks | Edit... | |

212

ToolSelectionRulesPM
This rule only applies to project managers

Row = Message Type
Column = Tool to use
Values = Probability a specific tool will be used

|  | Conversation | Email | Fax | Memo | Phone | Video | VoiceMail |
|---|---|---|---|---|---|---|---|
| Decision | n | n | n | n | n | n | n |
| Exception | n | n | n | n | n | n | n |
| InfoExchange | n | n | n | n | n | n | n |
| Meeting | n | n | n | n | n | n | n |
| Noise | n | n | n | n | n | n | n |

FIG. 25

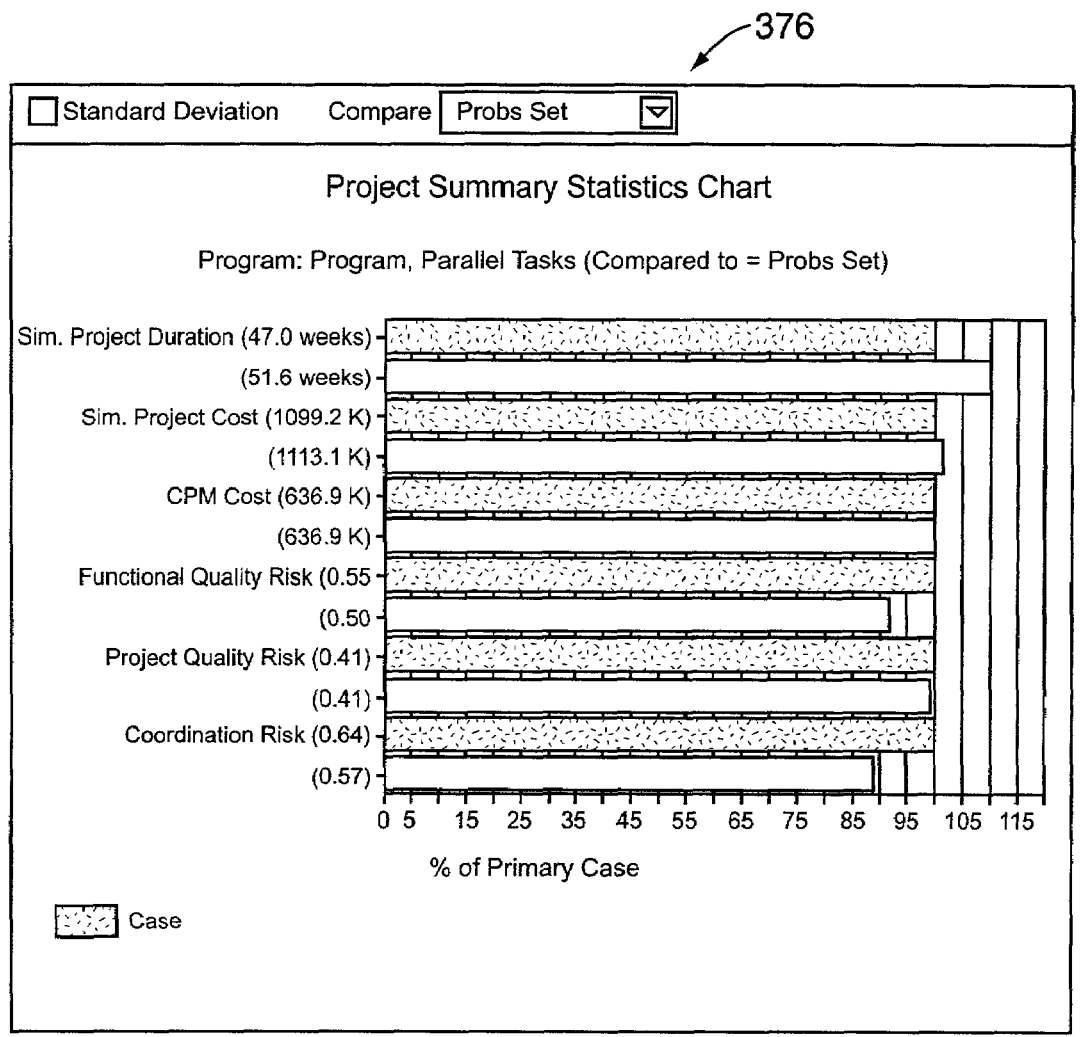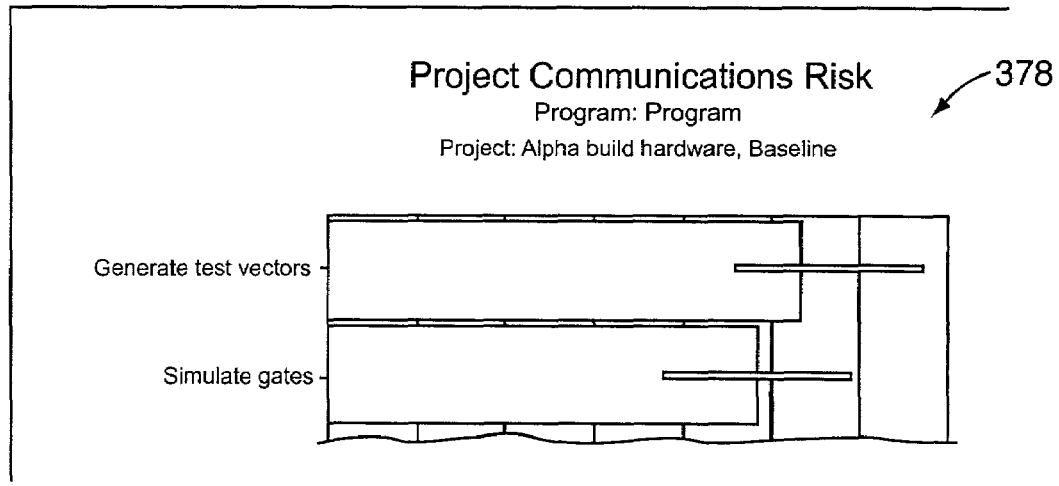
FIG. 27A

"EXCEPTIONS"

"COORDINATION"

| Project | Value | Units | |
|---|---|---|---|
| Name | Specification | | |
| Description | | | |
| Priority | Medium | | |
| Work Day | 8 | 🔒 | |
| Work Week | 6 | 🔓 | ← 412 |
| Team Experience | Medium | 🔒 | |
| Centralization | Medium | 🔒 | ← 414 |
| Formalization | Medium | 🔒 | |
| Matrix Strength | Medium | 🔒 | |
| Info Exchange Prob. | 0 | 🔒 | |
| Noise Prob. | 0 | 🔒 | |
| Functional Error Prob. | 0 | 🔒 | |
| Project Error Prob. | 0 | 🔒 | |
| Hyperlinks | Exit... | | |

FIG. 28

FIG. 29 "AVERAGE OVER TRIALS"

PROJECT MANAGEMENT SYSTEM AND METHOD

CROSS REFERENCE TO RELATED APPLICATION

This application claims the benefit of provisional application U.S. Ser. No. 60/303,752 filed on Jul. 6, 2001, entitled "PROJECT MANAGEMENT SYSTEM", incorporated herein by reference.

BACKGROUND OF THE INVENTION

The present invention relates to project management systems and more particularly to complex project management systems for large organizations.

Project management is sometimes employed by corporations to ensure timely completion of product development, construction and just about any plan requiring the utilization of multiple personnel and resources. Typically, employees with differing skill sets are selected for a project, a project leader is assigned, whom the employees report to, and the project leader establishes a schedule. The schedule details all of the necessary tasks and completion dates necessary for project success. Tasks are assigned by the project manager to employees based on their skill set. The project manager keeps track of the progress of the various tasks and attempts to remedy situations that can cause the project to fall behind schedule.

Professor John Fondahl of Stanford University developed, in the 1960's, a theory he called the "Circle and Connecting Line Diagram", later termed the Critical Path Method or "CPM". The Program Evaluation and Review Techniques or "PERT" method, developed at about the same time, is functionally equivalent, although it represents activities as the links between event nodes, rather than as the nodes. Both of these methods state that any project has a start and an end, and that in between the start and the end there are multiple, sequential tasks to complete. These tasks follow multiple parallel paths and combine at least by the finish. The path that takes the longest is termed the critical path and it dictates how long the project will take to complete.

A drawback of the Critical Path and PERT models is that the theories embodied in those models assumes a certain degree of independence of the various activities, that is, they only allow for precedence interdependence. However, this tends not to be the case with many knowledge work products. As such, some experts are not surprised that upwards of 50% of all projects do not get completed on time.

In a traditional work environment, a worker has at least one manager to whom they go to if they have a problem with an assigned task. In the best of all possible worlds, workers are able to complete their assigned tasks without any problems. However, in the real world, problems occur and the workers often discover that they cannot complete their work by the due date due, for example, to technical or coordination problems. In such situations, the workers will typically interface with their manager(s) in an attempt to address the issue at hand. The manager then might coordinate with other personnel to resolve the worker's issue or not address the issue. This is an example of coordination interdependence. In the latter situation, the worker will wait a certain amount of time and try to complete their task, absent input from their manager. This is an example of wait interdependence. The worker may be able to complete the task but there is a chance that it will not be done properly and rework will have to take place. This is an example of rework interdependence.

During implementation of project schedules using the relatively simplistic Critical Path Model and PERT model, the various factors listed above are not taken into account and these factors can ultimately lead to projects schedules that are systematically optimistic due to deficiencies in the model. Commercially available project management software tools typically assume independence of the various activities on the paths to completion, notably Microsoft Project and similar products by the Primavera and Artemis corporations.

Several existing tools, such as Microsoft Project and Primavera's P3, implement the traditional CPM-PERT theory project management. They define projects and allow description of sets of multiple projects. Within a project, tasks have assigned resources. They implement the CPM algorithm to generate a Gantt chart given a task plan and specified resource size. Using the CPM algorithm, projects fall within at least one path between a program start and a program finish. Each project has at least one task. They allow definition and editing of projects, tasks and resources. Resources can be assigned from a pool of named individuals. Some of these tools allow users to define one or more "Work Breakdown Structures" for the project or program organization, into which individual resources can be assigned at a particular level. This structure provides a way to define one-dimensional or multi-dimensional hierarchy of resources for purposes of aggregating data. However, these tools do not handle multiple interdependencies of tasks within a multiple project environment.

In the late 1980's through early 1990's, Stanford researchers including Professor Raymond Levitt and Drs. John Kunz and Yan Jin postulated that the various paths to project completion are often multiply dependent upon each other. By taking this approach they were able to lay the groundwork for VitéProject version 1.0 (released in 1998) and VitéProject version 2.0 (released in 1999) of the Vité Corporation of Mountain View, Calif. These products incorporated multiple relationships between activities that modeled information exchange and failure propagation dependencies between parallel activities, and thus were able to successfully model complex path interactions, in order to produce a more reliable and realistic project modeling.

While the VitéProject versions 1.0 and 2.0 were great leaps forward in project management tools, there are still other factors, which affect proper project management. One of these is the existence of other projects in an organization. These multiple projects very often have overlapping team members, causing an inter-relationship between the projects. That is, if one of the projects requires more time of an employee or group of employees than originally envisioned, other project schedules can be adversely affected since the original resources allocated for those projects has now been reduced. The VitéProject versions 1.0 and 2.0 did not address these multiple project issues.

Yet another factor not addressed by previous project management tools is the existence of complex business organizations, such as a matrix organization. A matrix organization is defined as having workers who report to multiple managers. That is, a worker will typically have both a functional manager and one or more project managers. For example, in a computer manufacturing company, a worker might be in the software group, and thus have a software functional manager, or in the hardware group, and have a hardware functional manager. In addition, the worker may be assigned to one or more projects, and thus have one or more project managers as well. This is an example of a two-dimensional matrix organization. Some companies have higher dimensional matrixes, e.g., three or more dimensional matrixes. For example, in addition to a functional and a project manager, the worker might report to a regional manager.

This type of complex organizational structure can present a dilemma for the worker if the worker has a problem that needs to be addressed involving his or her assigned tasks for a project. For example, in the case of a problem the worker must decide with which manager he should interface. Typically, the type of problem, or issue usually dictates to whom the worker should go for help. If it is a technical problem, for example, the worker should go to the functional manager. If it is a scheduling issue, the worker should go to the project manager. The ability to model these interactions is critical to accurately model and simulate a project schedule for complex organizations.

Accordingly, what is needed is a tool to realistically model project management that takes into account the multiple interdependence of project tasks, demand on worker's time from multiple projects, and the ability to handle complex organizational structures.

SUMMARY OF THE INVENTION

The present invention provides a system and method that take into account multiple interdependencies of project tasks, multiple projects, and complex organizational structures.

A program management structure in accordance with the present invention includes a plurality of projects, where each project is staffed with a project manager and at least one position reporting up to the project manager and wherein each project includes a plurality of tasks that can have multiple interdependencies. A plurality of organizations is also included, where each organization is provided with a plurality of departments, each of which has a department manager and at least one staffer reporting up to the department manager and filling at least part of at least one position. Additionally, project exceptions are reported to the project manager and functional exceptions are reported to the functional manager.

A method in accordance with the present invention for managing multiple projects includes initiating a program and wherein each project includes a plurality of tasks which can have multiple interdependencies including a plurality of projects and an organization. Also included is at least one of creating and editing at least one projects and the organization. Additionally, simulating the program utilizes the plurality of projects and the organization. Finally, the results of the simulated process are displayed.

A project management system for matrix organizations in accordance with the present invention includes a program object, a matrix organization structure, a project structure and a simulator that simulates a program using the department structure and the project structure.

An advantage of the present invention is the ability to be able to model the interactions of multiple projects. As such, the present invention allows for the overall optimization of the multiple projects typically being undertaken by an organization.

Another advantage of the present invention is that projects within complex organizations can be realistically modeled. This is accomplished by allowing for the modeling of multi-dimensional, i.e., two or more, matrix organizations for the purposes of project management.

These and other advantages of the present invention will become apparent to those skilled in the art upon a reading of the following descriptions and a study of the various figures of the drawing.

BRIEF DESCRIPTION OF THE DRAWINGS

FIG. 2 illustrates multiple projects within a program, and an exemplary task detail within one of the projects;

FIG. 6A is an example of a property table associated with the program template of FIG. 6;

FIGS. 9-18 illustrate property tables used in the process of FIG. 5;

FIG. 19 is a flow diagram illustrating the create/edit organizations operation of FIG. 5;

FIG. 25 is an example of a behavior file used in the present invention;

FIG. 27A is an exemplary output of the standard deviation calculation process of FIG. 27;

FIG. 28 is an example of a parameter lock process of the present invention;

and

Figure 38:
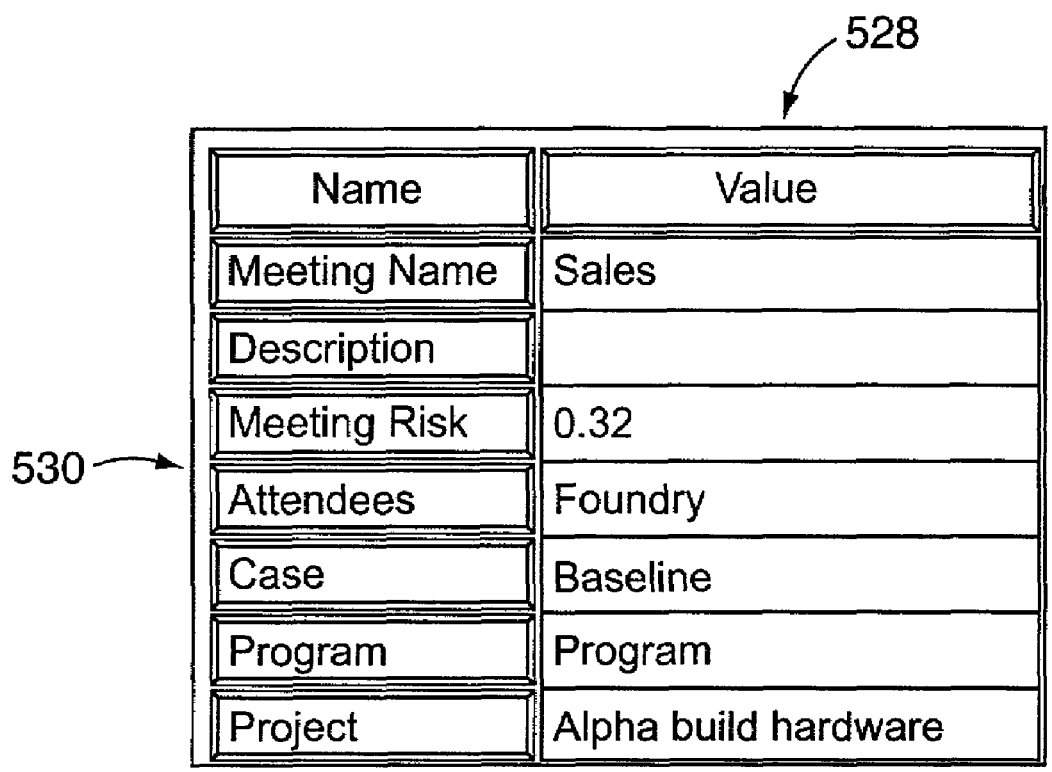

FIG. 38 is an example of a meetings table of the present invention.

DETAILED DESCRIPTION OF THE PREFERRED EMBODIMENT(S)

Figure 1:
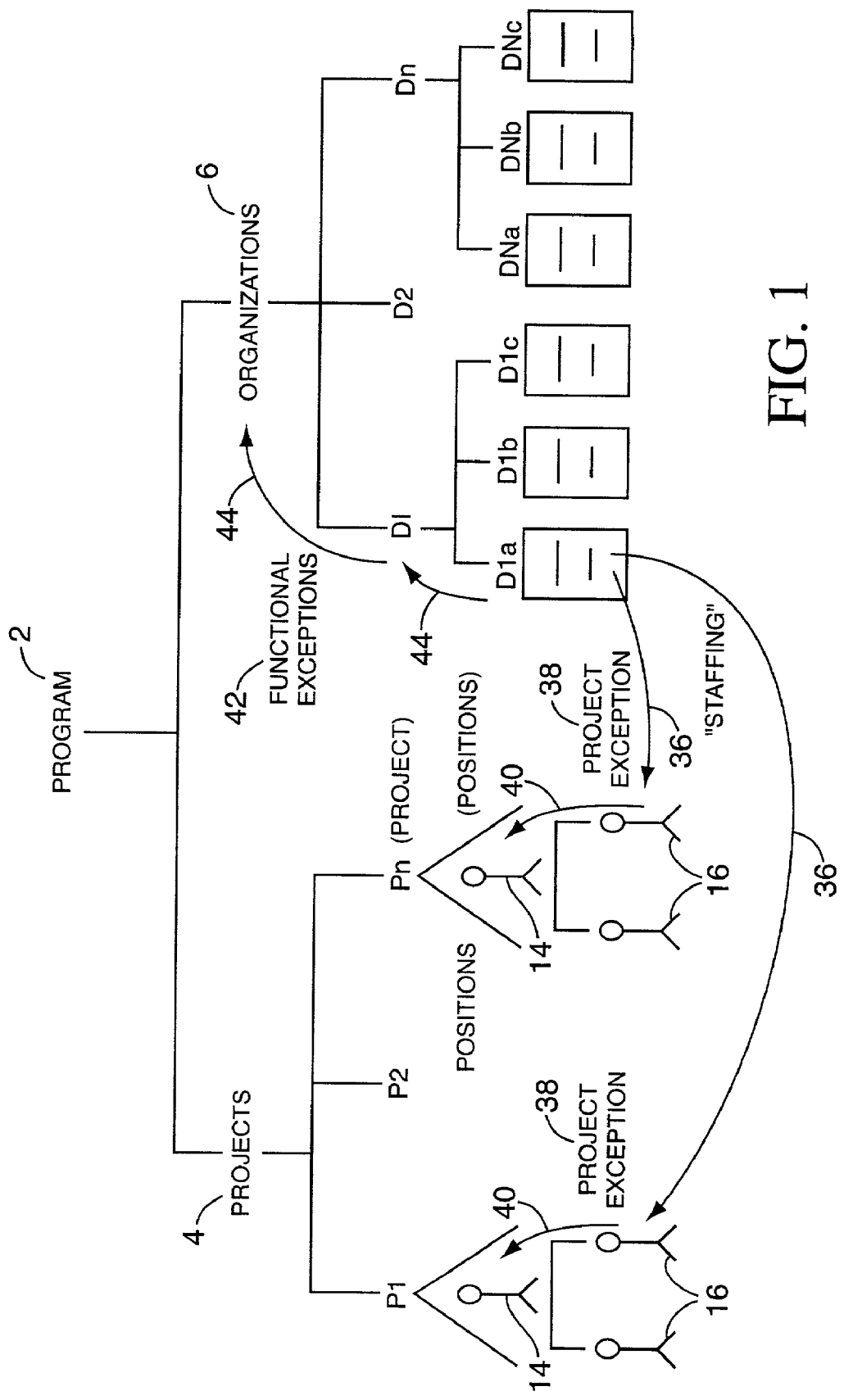
FIG. 1 illustrates a hierarchical program structure in accordance with the present invention including multiple projects and a matrix organization.

FIG. 1 illustrates a hierarchical "program" structure in accordance with the present invention including multiple projects and a matrix organization. That is, as used herein, the term "program" means a project management model in accordance with these descriptions. The matrix organization is composed of a program 2, a set of projects 4 and a set of organizations 6. Each of the individual projects P1, P2 and Pn (where "n" signifies up to "n" number of projects) has project leader positions 14 and project member positions 16. The individual organizations are headed by functional managers D1, D2 and Dn (where "n" signifies up to "n" number of functional managers). Below each of the functional managers (D1, D2 and Dn) exists the departments D1a, D1b, D1c, DNa, DNb and DNc (where "N" signifies up to "N" number of departments). Each of the departments (D1a, D1b, D1c, DNa, DNb and DNc) can consist of an individual or a group of individuals. The individuals from the organizational departments (D1a, D1b, D1c, DNa, DNb and DNc) staff the project leader positions 14 and the project member positions 16, signified by staffing arrows 36. The individuals from the organizational departments (D1a, D1b, D1c, DNa, DNb and DNc) thus can have two managers—a project manager 14 and a functional manager 18. The existence of this dual management role is referred to in general as the matrix organization. Additionally, individuals can be members of multiple projects.

With the existence of the matrix organization, an individual, D1a for example has two people to whom he/she can report a problem involving issues of performing their assigned tasks. In the present invention, the term "exception" is used to commonly refer to these issues and in general involves a situation where additional information is needed or a decision is needed. There are two types of exceptions. One type is a project exception 38. A project exception 38 occurs any time a project related issue arises and it is reported by a project team member 16 to a project leader 14. The upward reporting of a project exception 38 is indicated by project exception directional arrows 40.

The other type of exception is a functional exception 42. A functional exception 42 is very similar to a project exception 38 except that it involves work issues that an individual (D1a for example) would report to their functional manager 18. Also similarly to the project exception reporting directional arrows, the functional exception directional arrows 44 indicate the upward reporting of functional related exceptions.

Figure 1A:
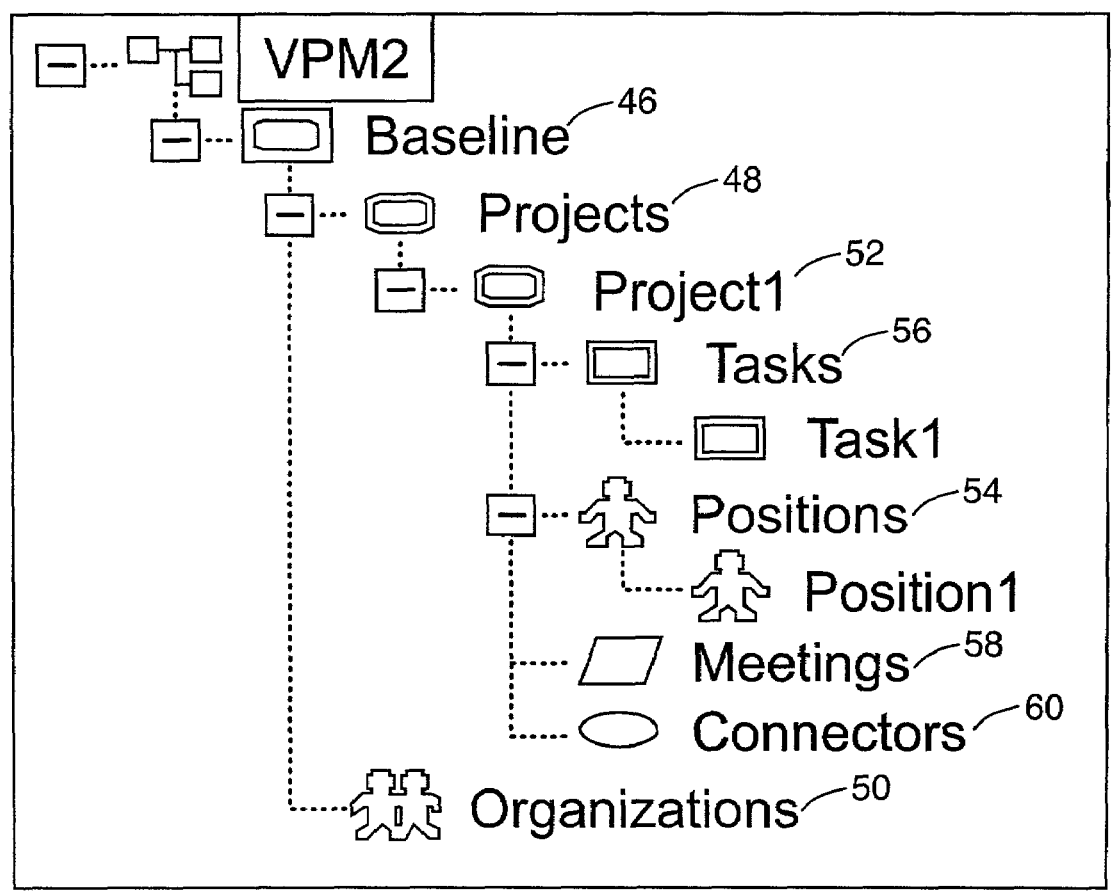
FIG. 1A is another depiction of the hierarchical program structure of FIG. 1.

FIG. 1A is another depiction of the hierarchical program structure of FIG. 1. The baseline 46 corresponds to a program 2. Projects 48 corresponds to projects 4. Organizations 50 corresponds to organizations 6. Project1 52 is representational of individual projects (8,10 and 12). Positions 54 can be analogous to project leader positions 14, project member positions 16, functional managers (D1, D2 and Dn) and individuals in departments D1a, D1b, D1c, DNa, DNb and DNc, respectively of FIG. 1. Additionally embodied in FIG. 1A are tasks 56, meetings 58 and connectors 60. A task 56 is defined as any work that consumes time, can generate communications or exceptions, and is required for project completion. A meeting 58 is defined as a gathering of positions 54 to communicate about the project, project1 52 for example. A connector 60 is a way of connecting a task in one project to a task in another project, representing any of a precedence, coordination or rework dependency.

FIG. 2 illustrates multiple projects within a program, and an exemplary task detail within one of the projects. The start of multiple inter-related projects is represented by a start box 62. The end of the inter-related projects is signified by the end box 64. In between are multiple projects P1, P2, P3 and $P_N$ (where "N" indicates that there can be "N" number of projects). An exploded view 76 of project P3 is also shown. Within the exploded view 76 are various tasks such as task 78 and task 80. A connector successor 82 joins the two tasks together and representations that task 78 needs to be completed before task 80 can be started.

Figure 3:
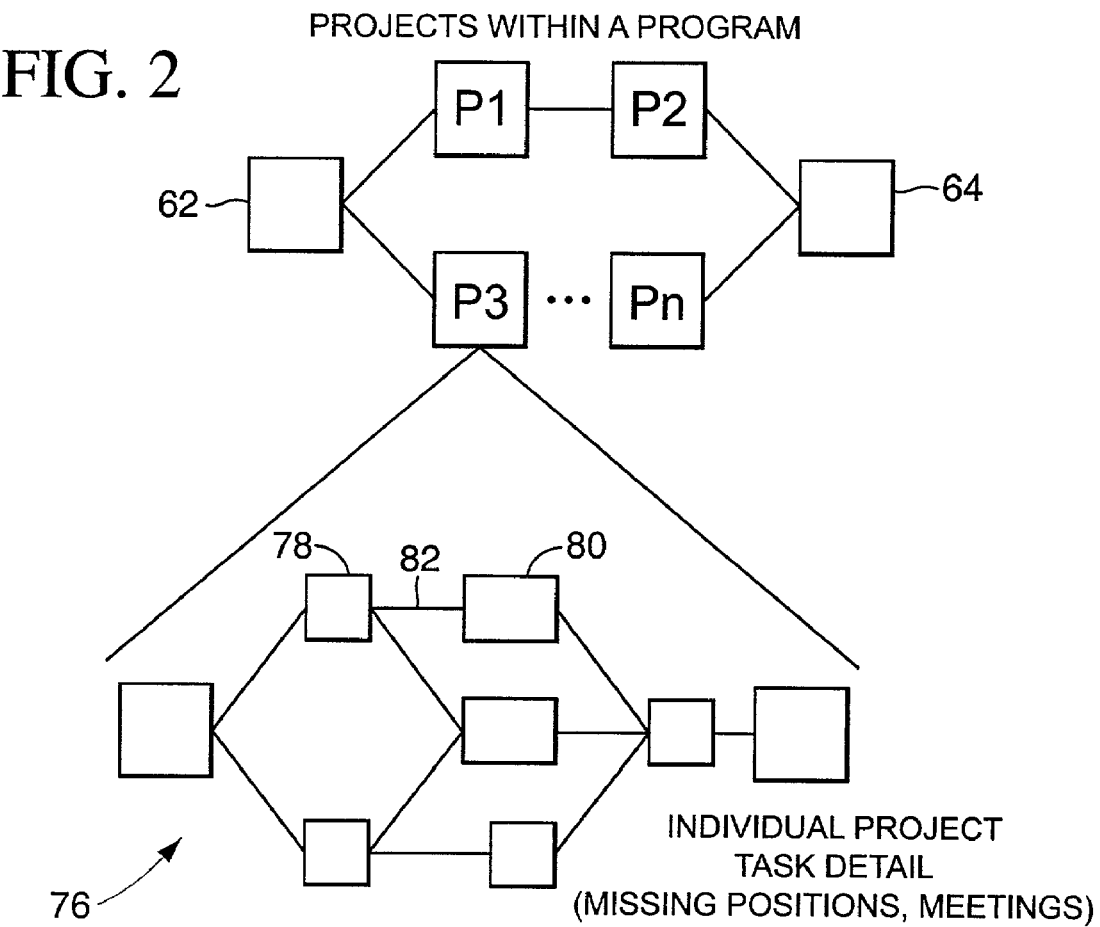
FIG. 3 illustrates an exemplary matrix organization.

FIG. 3 illustrates an exemplary matrix organization. Individuals 84 are represented in the first column and a singular individual is referred to as $I_1$ 86 and $I_N$ 88 (where "N" indicates that there can be "N" number of individuals). Tasks are represented by $T_1$ and $T_M$ (where "M" indicates that there can be "M" number of tasks). Finally in the last column 94 are individual projects. An individual from any department can be assigned to any task of any project.

Therefore it will be appreciated that a program management structure can include a plurality of projects, where each project is staffed with a project manager and at least one position reporting up to the project manager and wherein each project includes a plurality of tasks which can have multiple interdependencies, a plurality of organizations, where each organization is provided with a plurality of departments, each of which has a department manager and at least one staffer reporting up to the department manager and filling at least part of the at least one position, wherein project exceptions are reported to the project manager and functional exceptions are reported to the functional manager.

During simulation, the project exceptions are introduced statistically. At least one of the projects is provided with a plurality of positions reporting to the project manager. At least one of the projects can, optionally, be staffed with a plurality of staffers from departments and organizations. Additionally, at least one of the departments includes a plurality of staffers including at least one staffer who reports up to the department manager. The departments include a plurality of optional, but not required staffers. The functional exceptions can be further reported up to an organization manager by a department manager.

The plurality of projects can also fall within at least one project path between a program start and a program finish. The plurality of projects can also fall within a plurality of projects paths. Furthermore, multiple projects can fall on at least one of the multiple project paths.

The project includes a task detail including a task start and a task finish and at least one task path between the task start and the task finish. The task detail includes a plurality of task paths between the task start and the task finish. Finally, at least one of the task paths includes multiple tasks performed in sequence.

Figure 4:
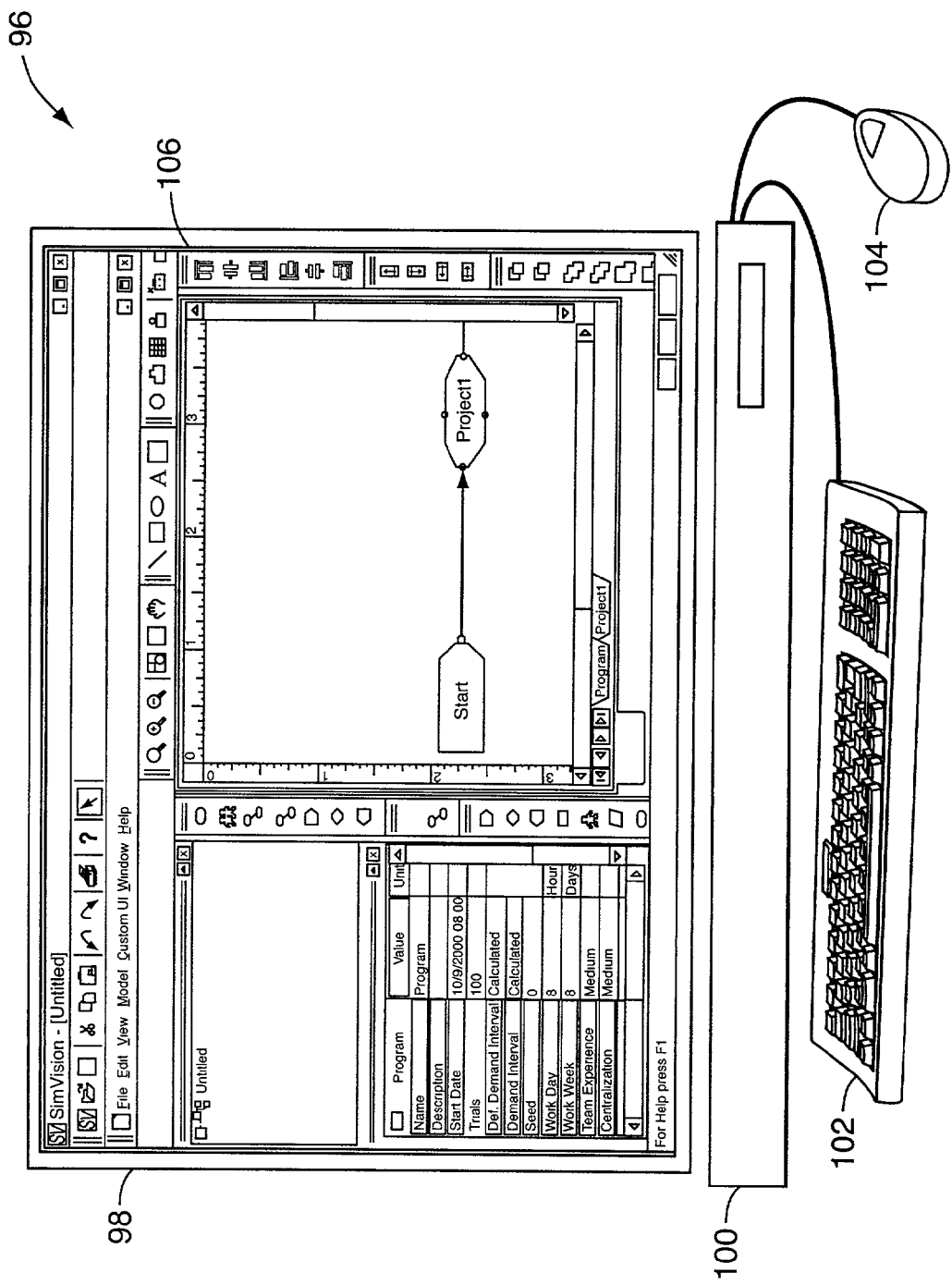
FIG. 4 illustrates a computerized project management system implementing the project management methodologies of the present invention.

FIG. 4 illustrates a computerized project management system implementing the project management methodologies of the present invention. The computerized project management system 96 typically includes a computer monitor 98, a workstation 100, a keyboard 102 and a pointer such as a mouse 104. Contained on the screen of the computer monitor is a typical startup screen 106 of the computerized project management system.

Figure 5:
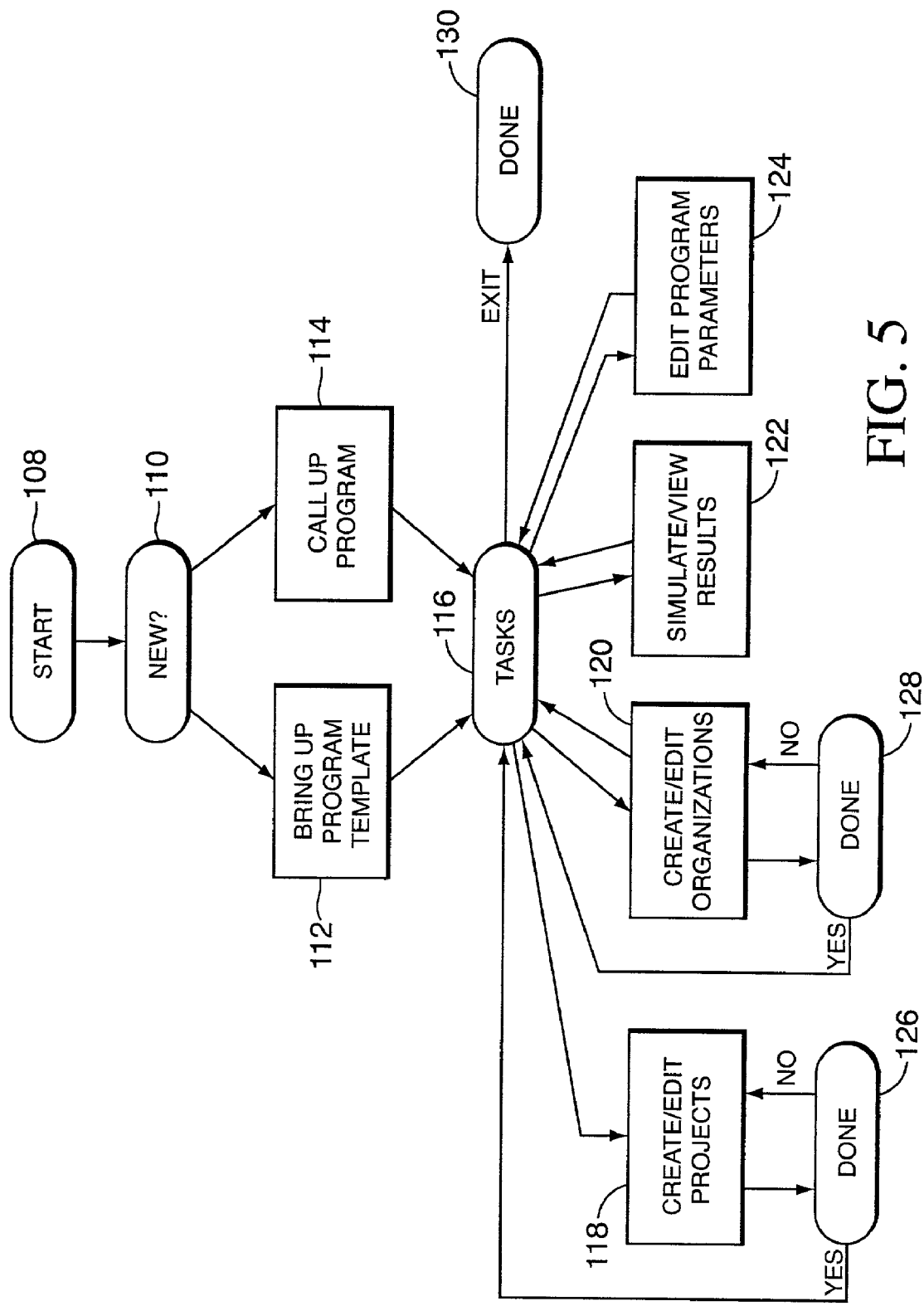
FIG. 5 is a flow diagram illustrating the project management system of the present invention.

FIG. 5 is a flow diagram illustrating the project management system of the present invention. The flow diagram starts at 108 and proceeds to a decision operation 110. At this juncture, two different paths can be followed—BRING UP PROGRAM TEMPLATE 112 and CALLUP PROGRAM 114. PROGRAM TEMPLATE 112 will load a pre-existing pattern, which the user can use as a stepping-stone to the next steps. Alternatively, CALLUP PROGRAM 114 can be selected to load a pre-existing program that a user previously was working with. Both paths converge at the TASKS 116 decision point. Following the TASKS 116 decision point, a number of options are available. These options are CREATE/EDIT PROJECTS 118, CREATE/EDIT ORGANIZATIONS 120, SIMULATE/VIEW RESULTS 122 and EDIT PROGRAM PARAMETERS 124. While just about any of the option paths can be followed independently of each other, CREATE/EDIT PROJECTS 118 is usually the first option to be selected. CREATE/EDIT PROJECTS 118 is used to produce individual projects and edit various parameters, which will be described in detail in another section. After a CREATE/EDIT PROJECTS 118 task is completed a first DONE 126 decision point is encountered. If more projects need to be created and or edited, control is returned to CREATE/EDIT PROJECTS 118. If not, TASKS 116 is returned to.

The CREATE/EDIT ORGANIZATIONS 120 can then be selected and in a fashion similar to the CREATE/EDIT PROJECTS 118 function, organizations can be defined and edited. Also similarly, a second DONE 128 decision point exists which allows for more creation/editing of organizations or a return to the TASKS 116 decision point.

Once all of the project and organization information has been entered, the SIMULATE/VIEW RESULTS 122 can be selected to simulate the interactions of the organization and projects. Afterwards, the results of the simulation can be displayed. Control is then returned to TASKS 116 decision point.

Based upon the outcome of SIMULATE/VIEW RESULTS 122, it may be desirable to select EDIT PROGRAM PARAMETERS 124. This option allows the user to change settings which effects the simulator contained within SIMULATE/VIEW RESULTS 122, which will be described in further detail in another section. Optionally, the projects and organizations could be further edited via the CREATE/EDIT PROJECTS 118 and CREATE/EDIT ORGANIZATIONS 120 operations. The SIMULATE/VIEW RESULTS 122 can once again be selected via the TASKS 116 option point to see what effects the various edits had on the simulator. Finally, the process is done at 130.

Figure 6:
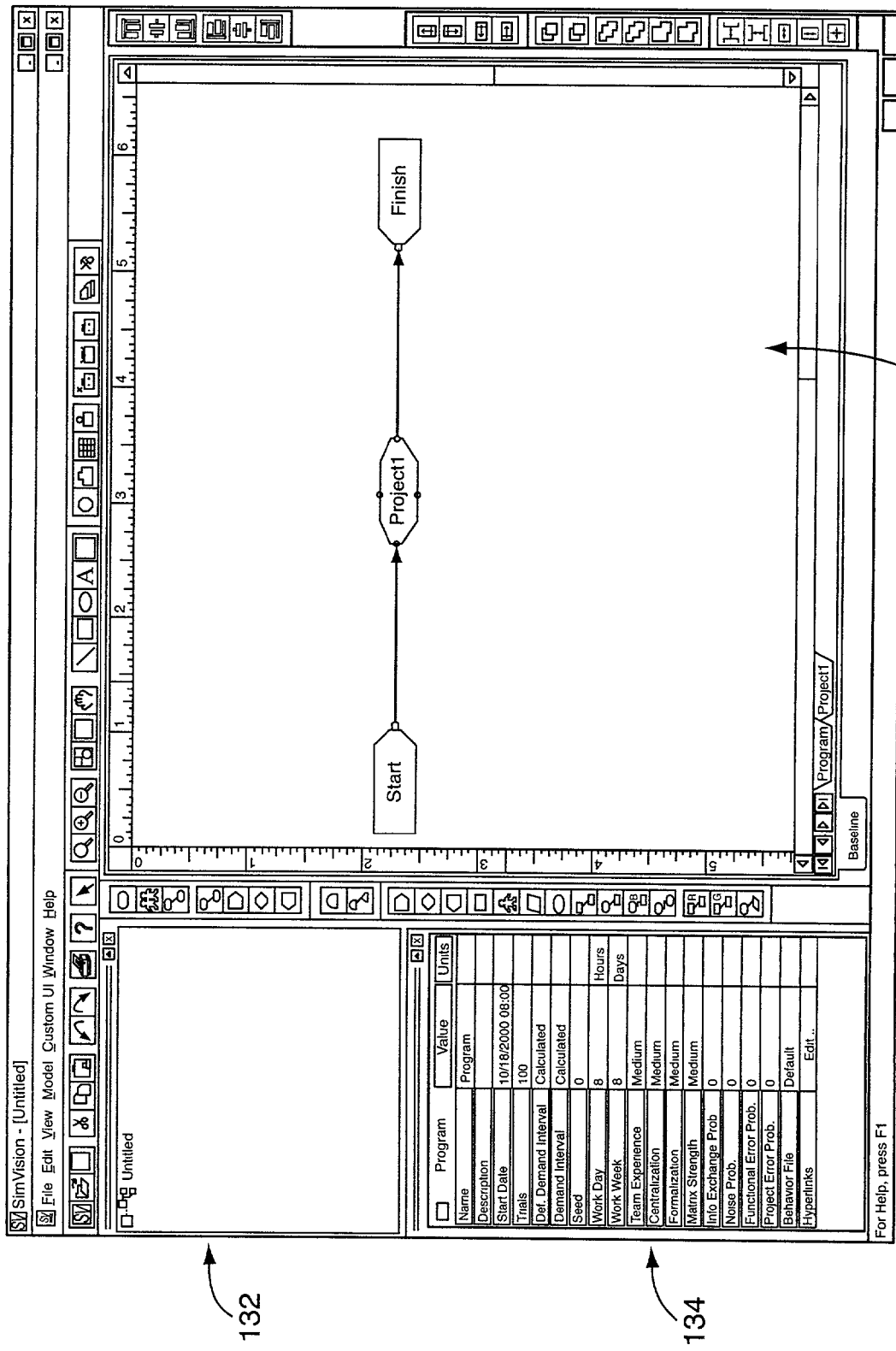
FIG. 6 is an example of a program template used in the process of FIG. 5.

FIG. 6 is an example of a program template used in the process of FIG. 5. The program template contains three main windows 132, 134 and 136 referred to as 'panes'. The tree pane 132 displays a visual hierarchy of open programs and their cases. The properties pane 134 is the area where various object parameters can be entered and edited. Finally there is the model plane 136 where a visual representation of the program or project can be depicted.

FIG. 6A is an example of a property table 138 associated with the program template of FIG. 6. The property table 138 is one example of a table, which contains various parameters, which can be edited. Some of these parameters in this particular sample include a name 140 that can be entered to easily identify the program. Another example data entry item is the start date 142 and so forth.

Figure 7:
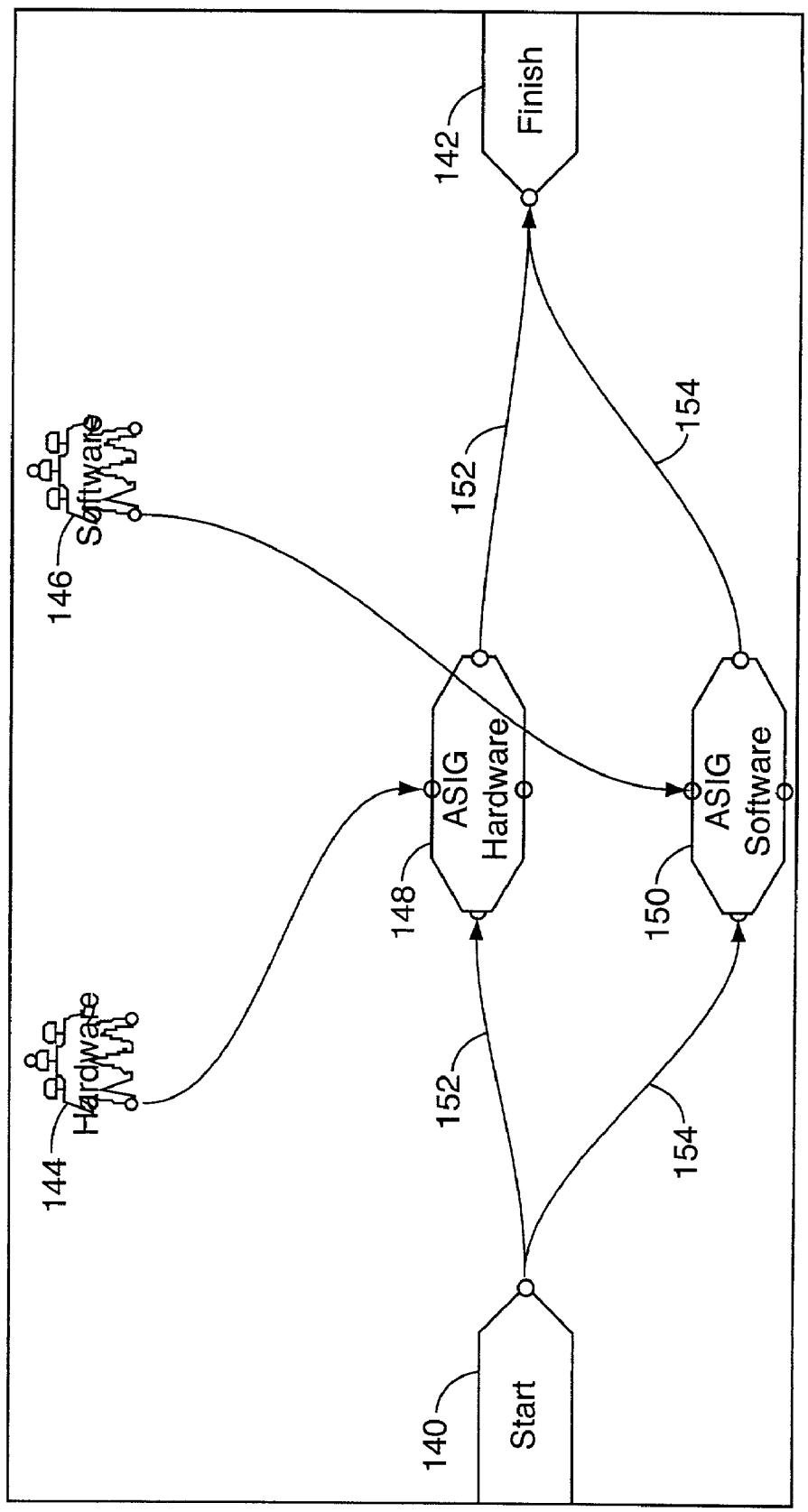
FIG. 7 is an illustration of the interaction of multiple projects and a matrix organization in the process of FIG. 5.

FIG. 7 is an illustration of the interaction of multiple projects and a matrix organization in the process of FIG. 5. Start icon 140 and finish icon 142 represent milestones. In this particular example there is a hardware team icon 144 and a software team icon 146. The hardware team has the task of delivering the ASIC hardware represented by icon 148 (ASIC is shorthand for application specific integrated circuit). The software team has the task of delivering the ASIC software represented by icon 150. Precedence lines 152 and 154 represent the order of tasks that must be completed in order for a project to be completed. In this example, to get from start 140 to finish 142, tasks ASIC hardware 148 and ASIC software 150 need to be completed by the hardware team 144 and the software team 146, respectively.

Figure 8:
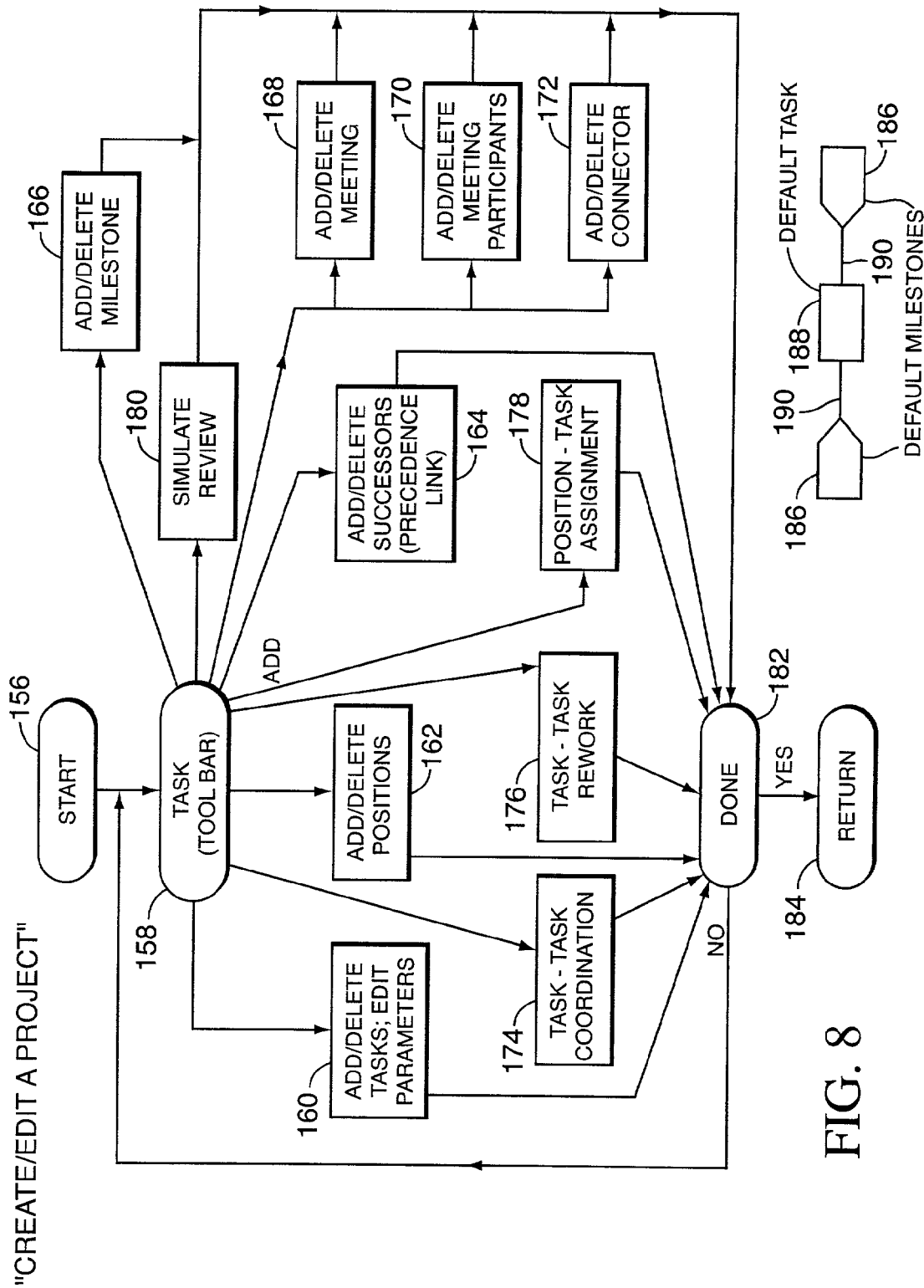
FIG. 8 is a flow diagram illustrating the create/edit projects operation of FIG. 5.

FIG. 8 is a flow diagram illustrating the CREATE/EDIT PROJECTS 118 operation of FIG. 5. The flow diagram begins with START 156 and proceeds to the TASK 158 toolbar. From the TASK 158 toolbar, several options are available. These include ADD/DELETE TASKS 160, ADD/DELETE POSITIONS 162, ADD/DELETE SUCCESSORS 164, ADD/DELETE MILESTONE 166, ADD/DELETE MEETING 168, ADD/DELETE MEETING PARTICIPANTS 170 and ADD/DELETE CONNECTOR 172 operations. Additionally, TASK-TASK COORDINATION 174, TASK-TASK REWORK 176, POSITION/TASK ASSIGNMENT 178 and SIMULATE/REVIEW 180 operations are also available. All of these operations converge on decision point DONE 182, which allows for control to return to TASK 158 or RETURN 184 that will return control of the computerized project management system 96 to the TASKS 116 of FIG. 5.

ADD/DELETE TASKS 160 allows the addition and subtraction of a task necessary for completion of a project step. ADD/DELETE POSITIONS 162 provides a way for the addition and subtraction of individuals to staff projects from an organization that then in turn can complete assigned tasks. In a similar fashion, ADD/DELETE SUCCESSORS 164 provides for adding and deleting a successor. A successor is defined as a line that links a milestone and a task. ADD/DELETE MILESTONE 166, ADD/DELETE MEETING 168, ADD/DELETE MEETING PARTICIPANTS 170 and ADD/DELETE CONNECTOR 172 operations also work in a similar fashion. A connector merely connects individual tasks in different projects, whereas a Successor links are a conjoint, i.e., a milestone or task cannot be reached until all of its preceding milestones and tasks are completed.

TASK-TASK COORDINATION 174 defines the order in which tasks are to be completed. TASK-TASK REWORK 176 defines how rework is handled in case a task cannot be completed properly. POSITION/TASK ASSIGNMENT 178 allows for a particular position or positions to be assigned to one or more tasks.

Additionally, example default graphics representing start and finish milestones 186, tasks 188 and successor links 190. As each of the described operations are gone through as described in FIG. 8, these example graphics (186, 188 and 190) start to appear in the model pane 136 of FIG. 6. The linkage by a successor link 190 and connector links (not shown) to milestones 186, tasks 188 and other various icons corresponding to the operations of FIG. 8 provides a graphical view of how all of the various project parameters relate to each other.

Figure 9:

FIGS. 9-18 illustrate property tables used in the process of FIG. 5. The property tables are used to define the various parameters relating to projects, tasks, staffing and other related items. FIG. 9 contains the position properties table 192. A position is defined as an abstract group representing one or more FTEs (full-time equivalents) that performs work and processes information. In a staffed project, positions represent a person or group of persons.

Figure 10:

FIG. 10 shows the task properties table 194. A task is any work that consumes time, can generate communications or exceptions, and is required for project completion.

The program properties table 196 is shown in FIG. 11. A program is a set of related projects that share dependencies and together achieve business objectives. A program also includes the associated responsible organizations, milestones and relationships between projects.

FIG. 12 displays the meeting properties table 198. A meeting occurs anytime a gathering of positions come together to communicate about a project and project tasks.

A milestone properties table 200 is shown in FIG. 13. At any point in a project or program where a major business objective is completed, a milestone is considered to have been achieved.

The organization properties table 202 is represented in FIG. 14. An organization is a group of departments that staff a program or project.

FIG. 15 shows the project properties table 204. A project describes work an organization must perform to achieve a major business milestone. The project is represented by tasks, milestones, the positions that perform the tasks, meetings and the dependencies between all these elements.

FIG. 16 is another view of a task properties table. Some of the more important properties that can be set are priority 208, work volume 210 and skills 211. Priority 208 defines how soon the task will be worked on by a project position. Work Volume 210 is the predicted time that all positions on a project spend doing direct work.

Another position properties table 212 is shown in FIG. 17. The role 214 property defines a position as a project manager, a subteam or a subteam leader. Application experience 216 is a measure of how familiar the position or person is with similar projects.

Figures 18, 19:
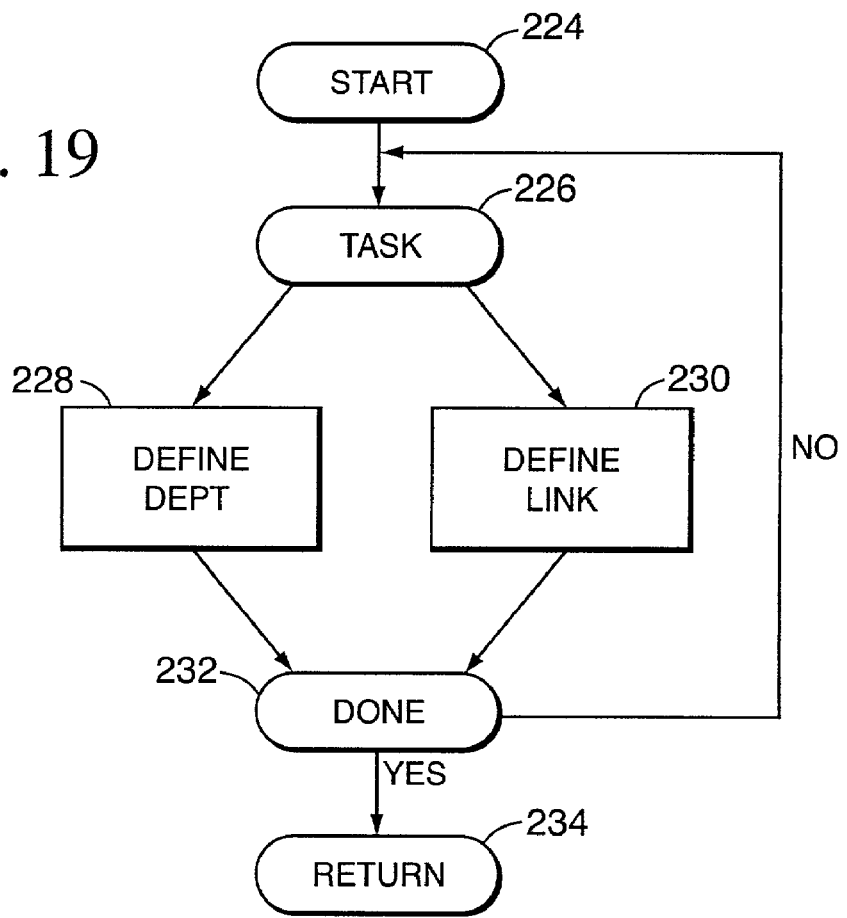

FIG. 18 depicts a successor link properties table 218. A successor link is a line that joins together milestones and tasks. The Type property 220 specifies how the successor (task or milestone) starts in relation to the predecessor. Lag 222 specifies the amount of time after a predecessor starts or finishes that the successor starts. Lag can be defined in minutes, hours, days, weeks, months or in terms of the percentage that the predecessor task is complete.

FIG. 19 is a flow diagram illustrating the create/edit organizations 120 operation of FIG. 5. The process starts at 224 and, in a decision operation 226, the appropriate task is determined. Operations DEFINE DEPT 228 or DEFINE LINK 230 can be selected. DEFINE DEPT 228 provides for the addition of a department in an organization. DEFINE LINK 230 operation is used to define the structure of how various departments relate to each other. For example, there may perhaps be two departments under one department head. This relationship is manifested through the DEFINE LINK 230 operation. After either operation DEFINE DEPT 228 or DEFINE LINK 230 is completed, a decision operation 232 determines whether the process is done. If not, process control returns to TASK 226, and, if so, process control is turned over to RETURN 234.

Figure 20:
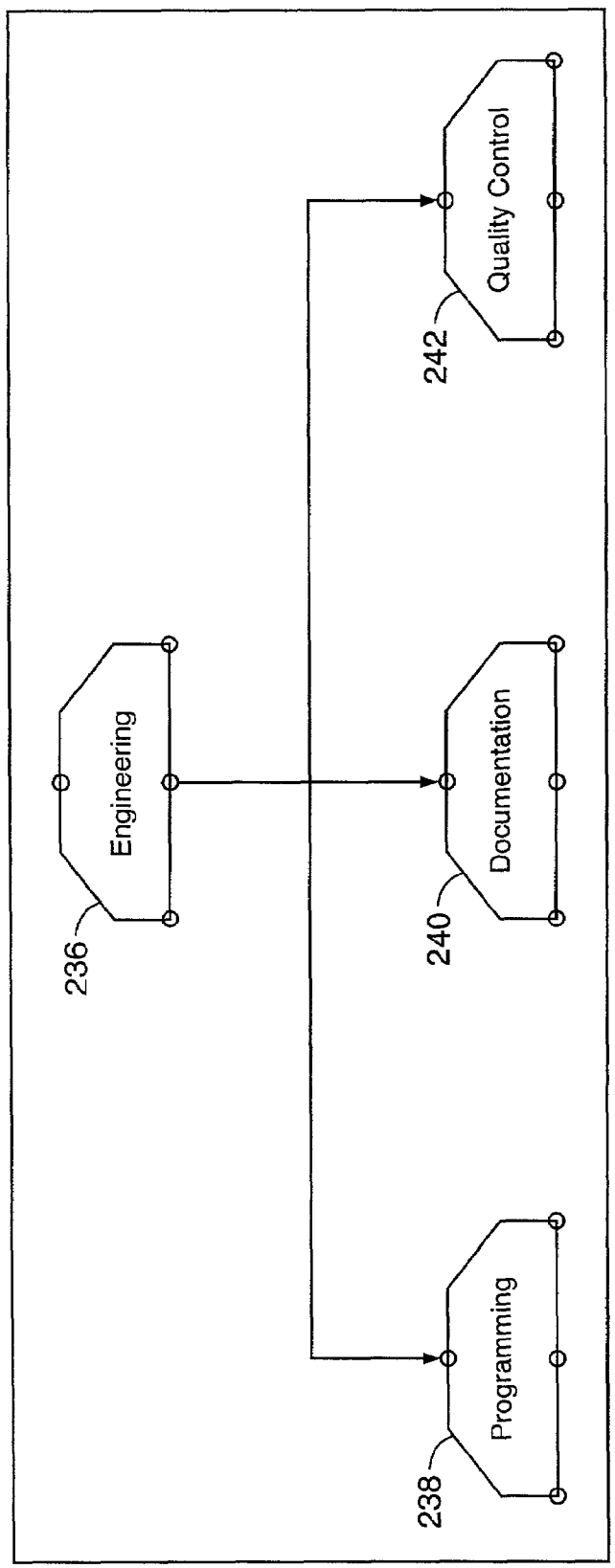
FIG. 20 is an illustration of the define departments operation of FIG. 19.

FIG. 20 is an illustration of the define departments 228 operation of FIG. 19. In this particular example, the engineering department 236 is composed of three sub-departments consisting of the programming department 238, the documentation department 240 and the quality control department 242.

Figure 21:
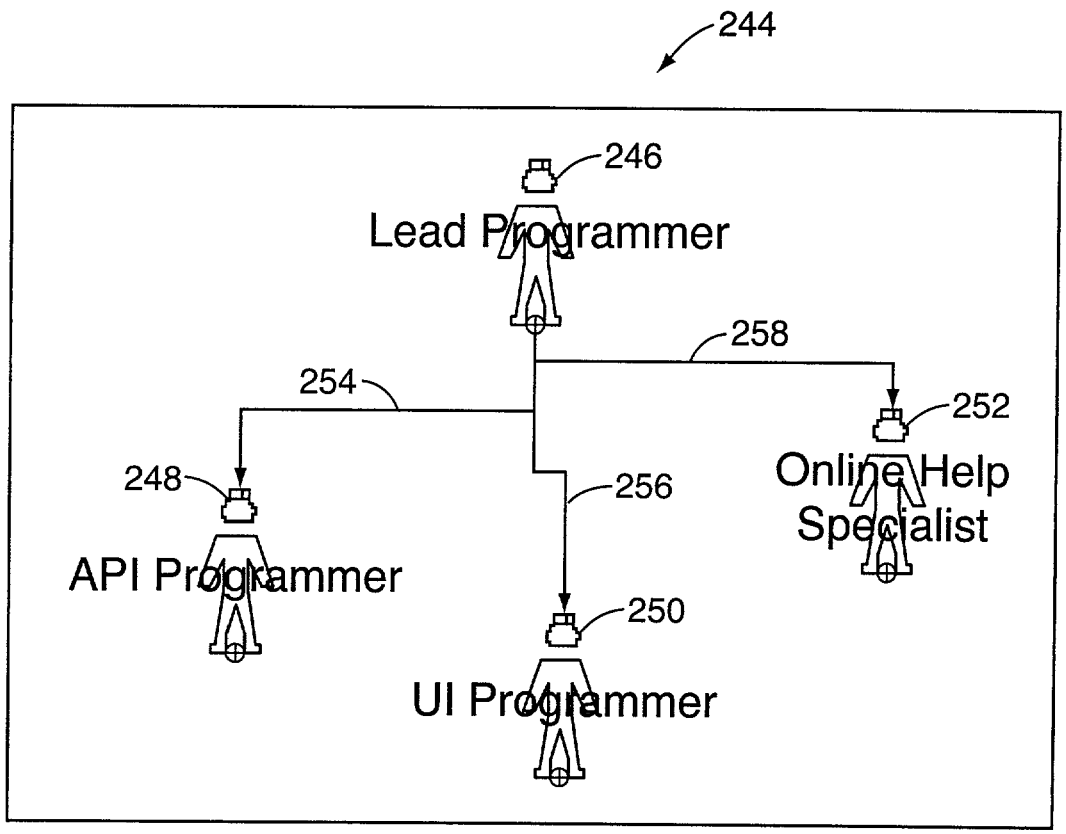
FIG. 21 is an illustration the define links operation of FIG. 19.

FIG. 21 is an illustration of the define supervision links operation of FIG. 19. The programming position 244 contains a lead programmer 246, an API programmer 248, a UI programmer 250 and an online help specialist 252. The position hierarchy is delineated by links 254, 256 and 258. Each of the links (254, 256 and 258) originate at the lead programmer 246 and point downward to the individual positions (lead programmer 246, API programmer 248 and UI programmer 250), which indicates that they report to the lead programmer position 246.

It will therefore be appreciated from the foregoing discussion that a method for managing multiple projects of the present invention includes initiating a program including a plurality of projects and an organization and wherein each project includes a plurality of tasks which can have multiple interdependencies, at least one of creating and editing at least one of projects and the organization, simulating the program utilizing the plurality of projects and the organization and displaying the results of the simulating process.

Also, the organization can include a plurality of departments. The organization is organized as a matrix organization. The matrix organization has at least one functional manager and at least one project manager. Also, at least one of creating and editing program parameters will affect the simulating process.

Additionally, initiating a program includes at least one task of retrieving a stored program and creating a new program. Creating a new program includes retrieving a program template. Editing a project includes at least one of adding and deleting at least one of tasks, positions, successors, milestones, meetings, and connectors. Editing a project further includes at least one of adding at least one of a task coordination, rework and task assignment. The editing of an organization can also include at least one of defining a department and defining a link.

Additionally, simulating the program includes, evoking a start milestone having a successor, iteratively evoking a successor which iteratively evokes a subtask and completing the simulation with an end milestone having no successor. Also for each subtask that is evoked, exceptions are handled. The exceptions can include information exceptions and failure exceptions.

Figure 22:
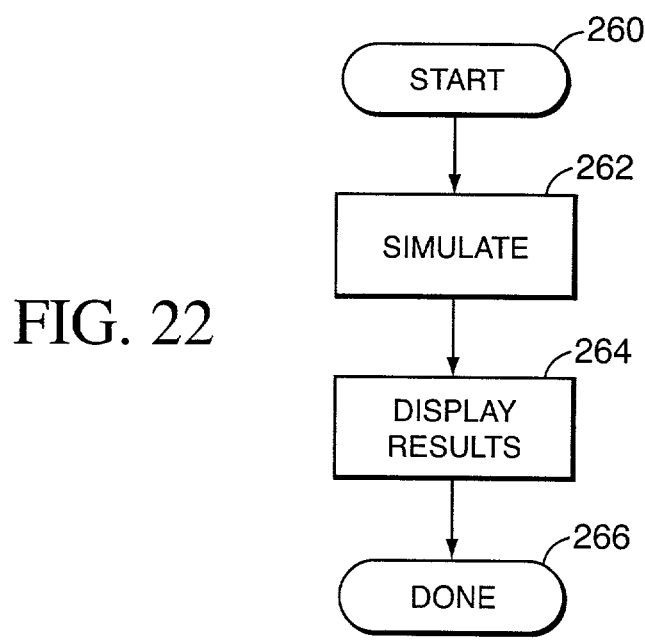
FIG. 22 is a flow diagram of the simulate/view results operation of FIG. 5.

FIG. 22 is a flow diagram of the simulate/view results 122 operation of FIG. 5. A START 260 point leads to the SIMULATE 262 operation. After the simulation is complete, the simulation results are displayed via the DISPLAY RESULTS 264 operation. Once the DISPLAY RESULTS 264 operation is complete, the simulate/view results 122 operation of FIG. 5 is completed at DONE 266.

Figure 22A:
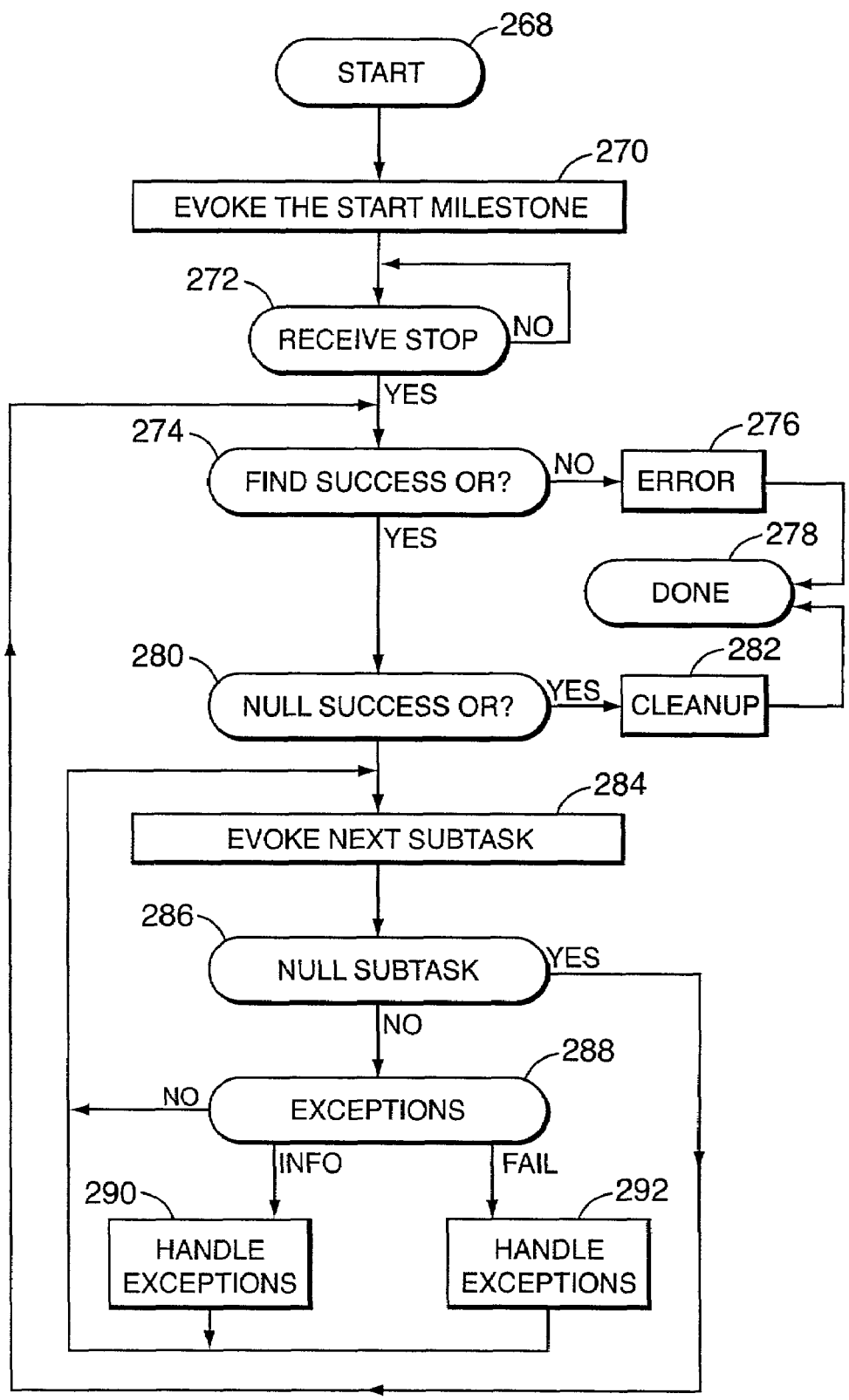
FIG. 22A is a flow diagram illustrating the simulate operation of FIG. 22.

FIG. 22A is a flow diagram illustrating the simulate 262 operation of FIG. 22. A START 268 point leads to the EVOKE THE START MILESTONE 270 operation. Next is the RECEIVE STOP 272 decision point. If no stop is received, the simulation continues to the FIND SUCCESSOR 274 decision point. If no successor is found, an ERROR 276 is generated and the simulation stops at the DONE 278 operation. If a successor is found, the simulation proceeds to the NULL SUCESSOR 280 decision point. If the successor does not lead to a subtask, a CLEANUP 282 operation is performed and the simulation stops at the DONE 278 operation. If the successor does lead to a subtask, control passes to the EVOKE NEXT SUCCESSOR'S NEXT SUBTASK 284 operation where it is determined if another subtask is linked to the next successor. Decision point NULL SUBTASK 286 then determines where control of the simulator will proceed to. If the previous subtask was completed successfully, control of the simulator is returned to the FIND SUCCESSOR 274 operation to continue the simulation from that point. If the previous subtask was not completed, control is passed to the EXCEPTIONS 288 decision point. The exception can either be ignored, have more information provided to handle the exception and complete the subtask via a first HANDLE EXCEPTIONS 290 operation or the subtask can be reworked via a second HANDLE EXCEPTIONS 294 operation. All three situations lead back to the EVOKE NEXT SUBTASK 284 operation. The simulator will continue to process each successor and subtask it encounters until no more successors are found or an end milestone is encountered.

Figure 22B:
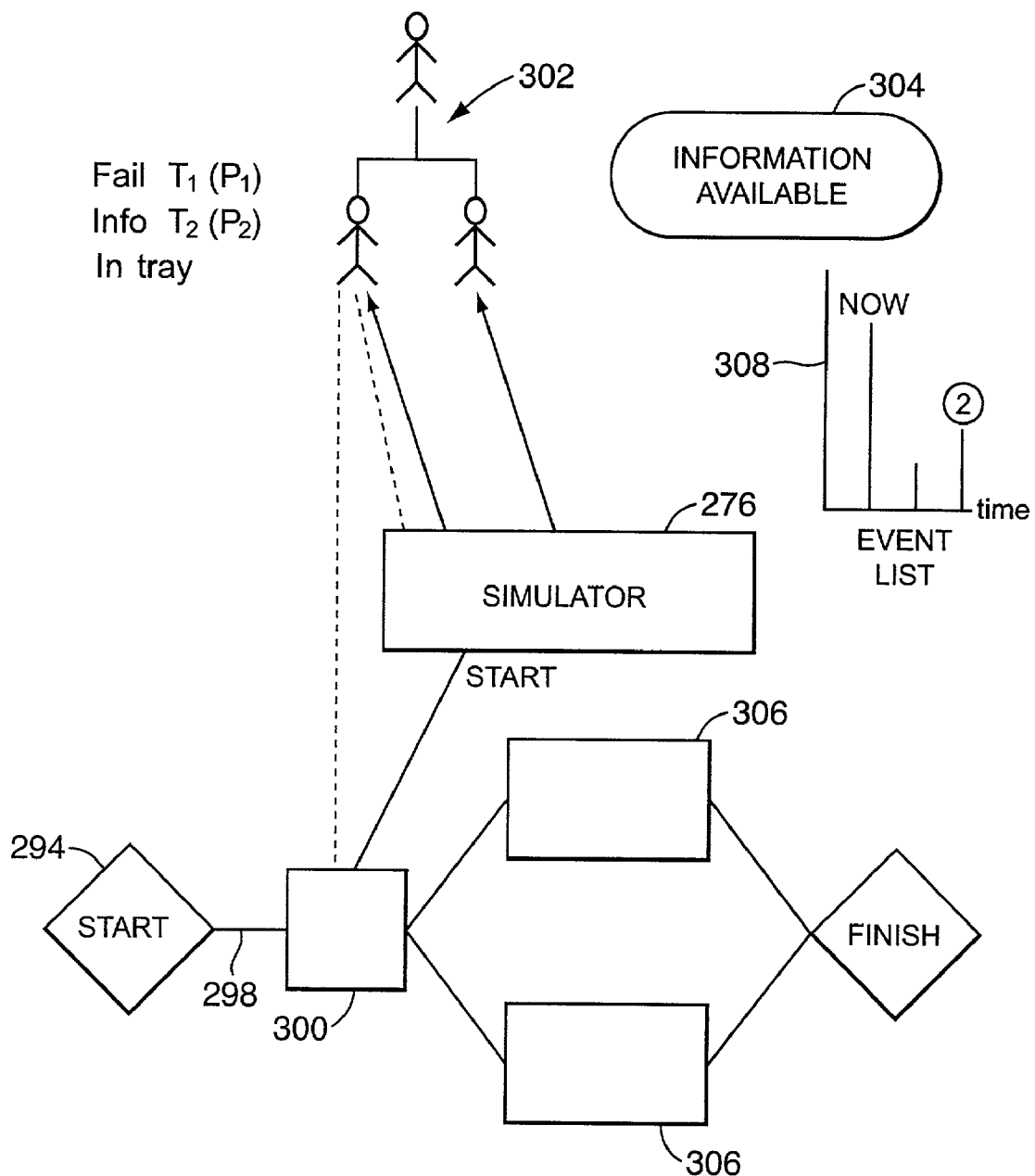
FIG. 22B is an illustration used to further explain the simulate operation of FIG. 22.

FIG. 22B is an illustration used to further explain the simulate operation of FIG. 22. A Start milestone 294 is detected by the simulation 296 and proceeds to successor link 298. The simulator finds that there is a subtask 300 attached to the successor link 298 and begins to simulate/process subtask 300. The simulator determines if the subtask can be successfully completed based on information previously inputted about staffing 302 and the information available 304. This information available 304 may be instructions on how to handle an exception for example—rework, ignore or possibly do a quick fix. The simulator 296 can then conceivably go on to analyze subtask 306 and subtask 308, if subtask 300 was completed successfully. If not, the simulation can potentially stop at any point and wait until the responsible position responds or a timeout occurs. Example analysis 308 generated by the simulator may for example indicate that event/subtask #2 may be the exception that is awaiting attention in order to successfully simulate a completed project.

Figure 23:
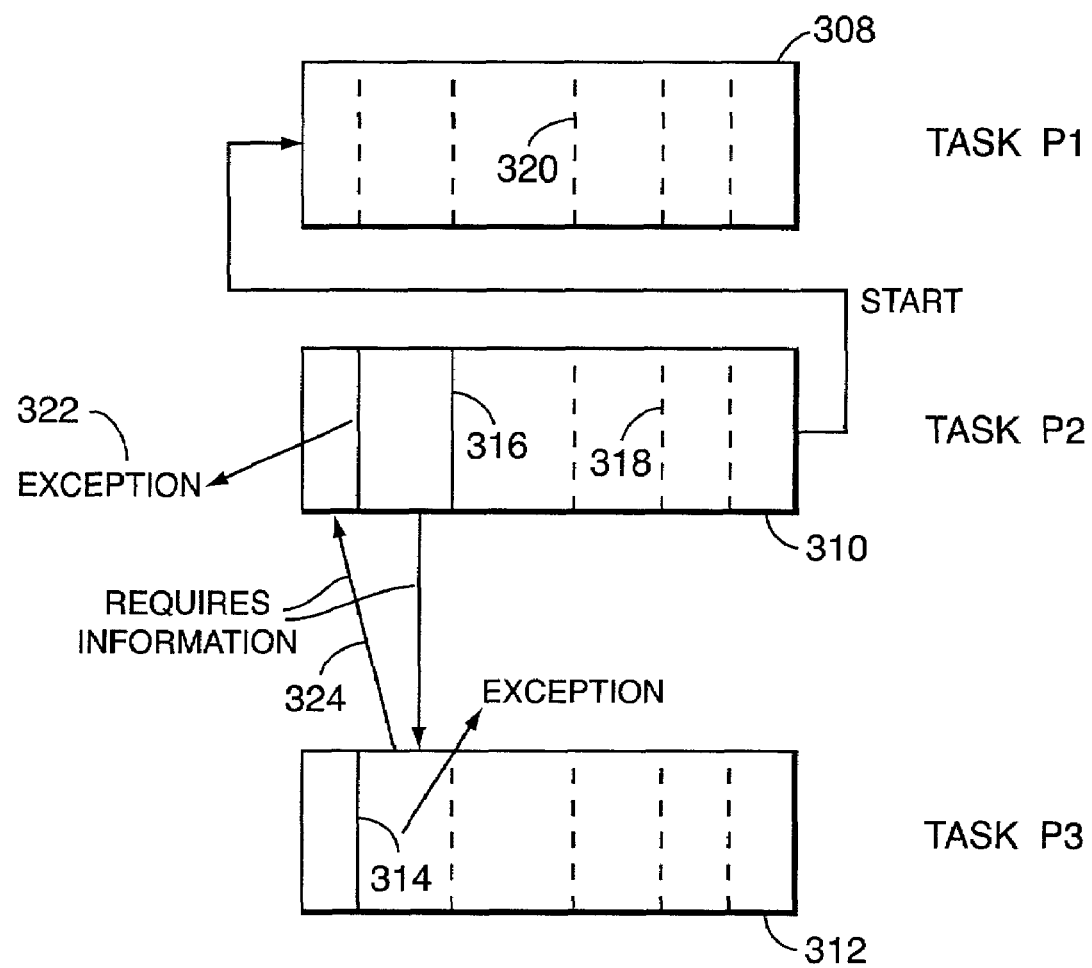
FIG. 23 is an example of simulation process flow in accordance with the present invention.

FIG. 23 is an example of simulation process flow in accordance with the present invention, and more specifically exception handling. If a subtask fails or requires information, that event initiates an exception to the responsible position and the responsible person has to decide how to respond. The responsible person or position has other competing needs though. It will do the best job it can in handling and balancing the competing needs. It can allocate attention based on a number of different factors such as urgency, age and newness. The point of exception handling is to try to model how these competing needs are handled. Exception handling initiates attention allocation, which in turn initiates a decision and coordination.

Projects tasks P1, P2 and P3 are displayed in FIG. 23. Each of the tools include a number of sub-tasks indicated by broken lines (e.g. lines 318, 320). Solid lines 314 and 316 indicate completed sub-tasks. If an exception 322 has occurred in project P2, it may require information 324 from project P3, in order to handle exception 322. This information may take the form of additional manpower, money, time or other resources. This can affect the completion date of project P3 since resources were taken away to address a problem involving a parallel project. This modeling of competing needs from parallel and sometimes sequential projects is referred to as multi-project exception handling.

Figure 24:
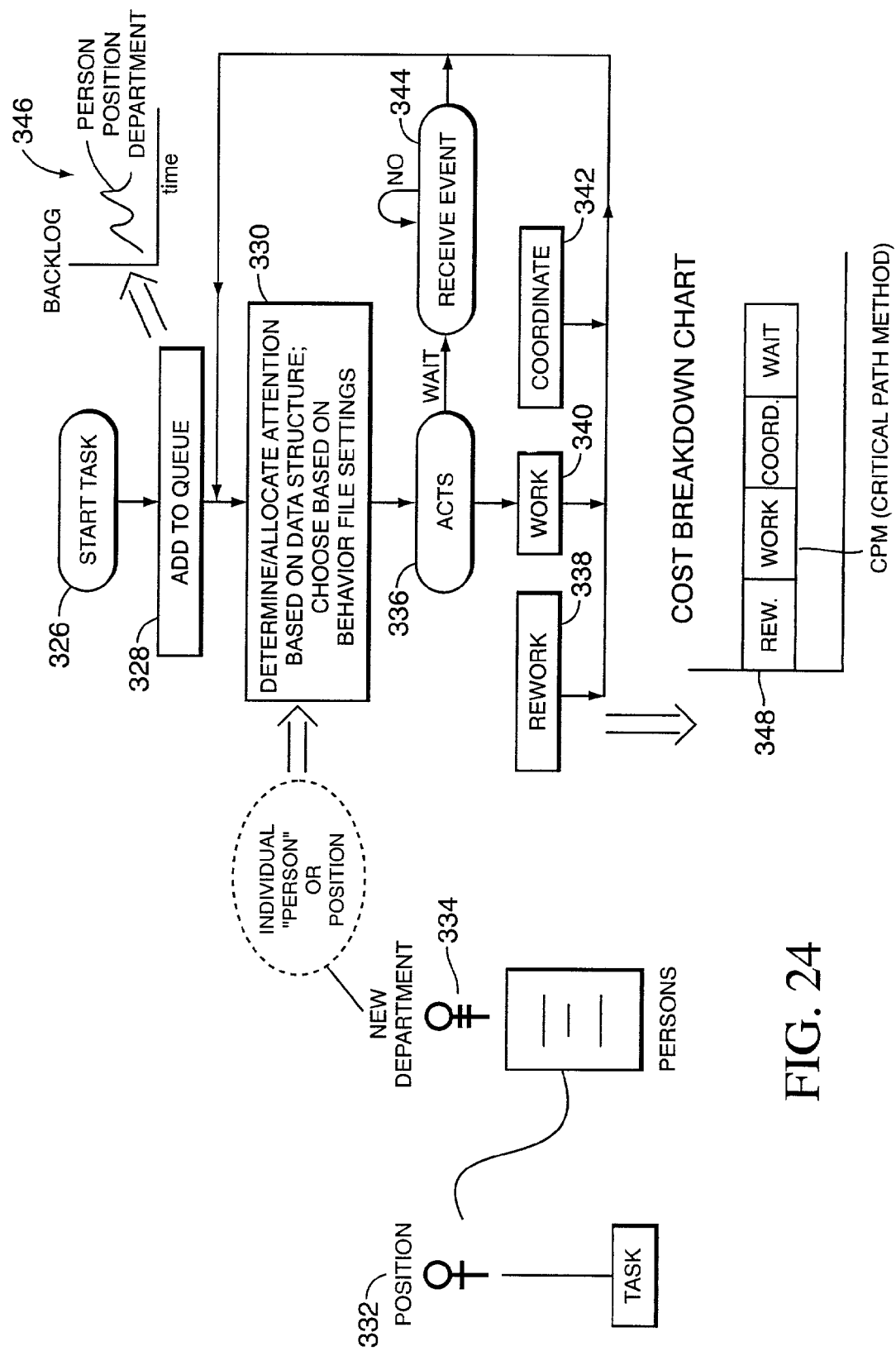
FIG. 24 is a flow diagram illustrating the simulation process flow.

FIG. 24 is a flow diagram illustrating the simulation process flow. A START TASK 326 operation leads to an ADD TO QUEUE 328 operation which, collects exceptions. Once an exception has been added, control is passed to the DETERMINE/ALLOCATE 330 operation. The DETERMINE/ALLOCATE 330 operation determines who the exception is reported to. This decision is based on the data structure of the exception (for example functional or project manager) and on the behavior file settings which, will be discussed in more detail in a later section. Exceptions can be referred to an individual position 332 or perhaps a responsible person 334. Once operation 330 is completed, control is passed to the ACTS decision point 336. Four possibilities can now happen—REWORK 338, WORK 340, COORDINATE 342 or wait to RECEIVE EVENT 344. REWORK 338 involves redoing all or part of a task. WORK 340 can consist of a quick fix. COORDINATE 342 involves obtaining information or resources to handle the exception. Finally, the responsible position 332 or department 334 may need to wait to receive the necessary information or resources in order to handle the exception and complete the task. Once the exception has been handled, control is returned to DETERMINE/ALLOCATE 330. Once the simulation has been completed, analysis can be done to identify where exceptions are occurring and why. Some examples of this type of analysis include a backlog chart 346 which, shows how a backlog of unfinished tasks varies over time as a function of person, position or department depending on the desired output. Another example is the cost breakdown chart 348 which shows what particular exception handling mechanism is being used the most. For example rework could possibly be the largest percentage of how exceptions are handled. This ties back into the previously mentioned Critical Path Method theory that states that the longest task dictates how long a project will take.

This example of the interaction of rework, work, coordinate and wait/receive event are examples of multiple interdependencies between the tasks of a project within the multiple program environment. This is in contrast to other multiple project systems which allow only precedence interactions between the tasks in a model.

FIG. 25 is an example of a behavior file used in the present invention. The behavior file specifies how attention allocation is determined and is based upon new-ness, randomness and age. The ToolSelectionRulesPM table 350 shows the various items that can affect how a project manager spends work time. The following section discloses all of the various behavior files used in the present invention in association with the simulator.

Behavior Matrix Variables and Relationships

Each matrix defines an association set: the row selection, when associated with the column selection, has the behavior of the corresponding matrix value. For example, for the ParticipantAttentionRule, a Project Manager (PM) will select an item from the intray by Priority with probability n. Notation:

PM=Project Manager

SL=participant subteam leader

ST=participant

Participant Attention Rule

A participant uses this attention rule to select an item from its in-tray. By default, all participants in ViteProject share this common attention rule. See table 1.

Example: a Project Manager (PM) will select an item from the in-tray by priority with probability n, with FIFO with probability n, etc.

Row=Participant role.
Column=Item Selection strategy.
Values=Probability corresponding strategy will be applied

TABLE 1

|    | Priority | FIFO | LIFO | Random |
|----|----------|------|------|--------|
| PM | n        | n    | n    | n      |
| SL | n        | n    | n    | n      |
| ST | n        | n    | n    | n      |

Participant Tool Selection Rules

Information exchange tool selection is based on only Message types (e.g., Exception, Decision, etc.) A tool selected for an information exchange determines (1) the time needed for the message to move from one participant to another and (2) the time the message will stay in the in-tray of the receiver participant. See table 2.

Example: Given an exception to process, the PM will never choose the Phone or Video. Note that Decisions go directly to the recipient in-tray without use of a information exchange tool.

ToolSelectionRulesPM

This rule only applies to project managers
    Row=Message type
    Column=Tool to use
    Values=Probability a specific tool will be used

TABLE 2

|              | Conversation | Email | Fax | Memo | Phone | Video | VoiceMail |
|--------------|--------------|-------|-----|------|-------|-------|-----------|
| Decision     | n            | n     | n   | n    | n     | n     | n         |
| Exception    | n            | n     | n   | n    | n     | n     | n         |
| InfoExchange | n            | n     | n   | n    | n     | n     | n         |
| Meeting      | n            | n     | n   | n    | n     | n     | n         |
| Noise        | n            | n     | n   | n    | n     | n     | n         |

ToolSelectionRulesSL

This rule only applies to participant leaders. See table 3.

Row=Message type

Column=Tool to use

Values=Probability a specific tool will be used

TABLE 3

|              | Conversation | Email | Fax | Memo | Phone | Video | VoiceMail |
|--------------|--------------|-------|-----|------|-------|-------|-----------|
| Decision     | n            | n     | n   | n    | n     | n     | n         |
| Exception    | n            | n     | n   | n    | n     | n     | n         |
| InfoExchange | n            | n     | n   | n    | n     | n     | n         |
| Meeting      | n            | n     | n   | n    | n     | n     | n         |
| Noise        | n            | n     | n   | n    | n     | n     | n         |

ToolSelectionRulesST

This rule only applies to sub teams. See table 4.
    Row=Message type
    Column=Tool to use
    Values=Probability a specific tool will be used

TABLE 4

|  | Conversation | Email | Fax | Memo | Phone | Video | VoiceMail |
|---|---|---|---|---|---|---|---|
| Decision | n | n | n | n | n | n | n |
| Exception | n | n | n | n | n | n | n |
| InfoExchange | n | n | n | n | n | n | n |
| Meeting | n | n | n | n | n | n | n |
| Noise | n | n | n | n | n | n | n |

Activity Verification Failure Probability (VFP) Adjustments

The formula used to determine activities' internal and external VFP:

task.VFPexternal=proj.VFPexternal*SolutionComplexityEffect*ParticipantSkillEffect;

task.VFPinternal=proj.VFPinternal*RequirementComplexityEffect*ParticipantSkillEffect;

The adjustment coefficients (e.g., SolutionComplexityEffect, ParticipantSkillEffect) are determined by values in the following matrices.

SolutionComplexityEffect

Effect of task solution complexity on processing speed of responsible participants. See table 5.

TABLE 5

| Level of solution complexity | Value of SolutionComplexityEffect |
|---|---|
| High | n |
| Medium | n |
| Low | n |

RequirementComplexityEffect

Effect of task requirement complexity on responsible participant processing speed. See table 6.

TABLE 6

| Level of requirement complexity | Value of RequirementComplexityEffect |
|---|---|
| High | n |
| Medium | n |
| Low | n |

ParticipantSkillMatchVFP

Effect of Participant-Task skill match on VFP:

If participant skill matches the skill requirement of the task, use this matrix to determine ParticipantSkillEffect. See table 7.

Row=Level of participant App. Experience
Column=Participant Required Skill Level.

TABLE 7

|  | High | Medium | Low |
|---|---|---|---|
| High | n | n | n |
| Medium | n | n | n |
| Low | n | n | n |

ParticipantSkillNonMatchVFP

Effect of Participant-Task skill non-match on VFP:

If participant skill DOES NOT match the task's skill requirement, use this matrix to determine ParticipantSkillEffect. Failure of participant-task skill match creates a major VFP penalty. See table 8.

Row=Level of participant App. Experience
Column=Participant other Skill Level.

TABLE 8

|  | High | Medium | Low |
|---|---|---|---|
| High | n | n | n |
| Medium | n | n | n |
| Low | n | n | n |

Activity Information Exchange Frequency Adjustment

The following formula is used to determine probabilistic information exchange frequency of an activity. See table 9.

task.InfoExchangeFrequency=proj.InfoExchangeFrequency*ActivityUncertaintyEffect*TeamExperienceEffect ActivityUncertaintyEffect Effect of Activity uncertainty on information exchange frequency:

TABLE 9

| Level of activity uncertainty | Value of ActivityUncertaintyEffect |
|---|---|
| High | n |
| Medium | n |
| Low | n |

TeamExperienceEffect

Effect of responsible Participant team experience on information exchange frequency. See table 10:

TABLE 10

| Level of participant team experience | Value of TeamExperienceEffect |
|---|---|
| High | n |
| Medium | n |
| Low | n |

Participant Processing Speed Adjustment

The following formula determines participant processing speed. Since participant processing speed is based on its match with the skill requirement of its assigned task, the ParticipantSpeed is associated with each task. This requires that each task can have only ONE primary responsible par ticipant working on it. The rule uses 1/ "time needed to process a work unit" to calculate speed.

```
task.ResponsibleParticipantSpeed=1.0/
    (Participant.NumberOfParticipants*Participant.APS0*
    ParticipantSkillEffect*Participant.TimePercentageForProject)
```

ParticipantSkillMatchAPS

Effect of Participant-Activity match on APS:

If responsible participant skill matches the task's skill requirement, use this matrix to determine the value of ParticipantSkillEffect. See table 11.

Row=Level of participant App.Experience.

Column=Participant Required Skill level.

TABLE 11

|  | High | Medium | Low |
| --- | --- | --- | --- |
| High | n | n | n |
| Medium | n | n | n |
| Low | n | n | n |

ParticipantSkillNonMatchAPS

If participant skill DOES NOT match task's skill requirement, then use this matrix to determine the value of ParticipantSkillEffect. See table 12.
  Row=Level of participant App. Experience.
  Column=Participant Other Skill level.

TABLE 12

|  | High | Medium | Low |
| --- | --- | --- | --- |
| High | n | n | n |
| Medium | n | n | n |
| Low | n | n | n |

Definition of Rework, Quick-Fix, and Ignore Decisions

This matrix defines how much of the original failed work should be reworked based decision types (i.e., Reworked, Quick-Fixed, Ignore).See table 13.

Actual rework volume=given work item volume*% of failed work that needs to be reworked*user-interface defined "Strength" of dependent task relationship The values change depending on the failure types described below:
  Internal-Internal: Amount of rework of a task given internal failure (based on VFPInternal.)
  Internal-External: Amount of rework of a task given external failure (based on VFP External.)
  Internal-External Amount of rework of a failure dependent task given external failure of an independent task
    (based on VFP External of the independent task.)
ReworkVolume
  Row=Failure type
  Column=Decision for the exception

TABLE 13

|  | Rework | Quick-Fix | Ignore |
| --- | --- | --- | --- |
| Internal | n | n | n |
| Internal-External | n | n | n |
| External-External | n | n | n |

Impact of Participant Information Exchange Behavior on its VFP

Vité simulates the impact of participant information exchange behavior on its VFP by updating VFP based on the effect weight as shown below (same for VFPexternal and VFPinternal):

task.VFPinternal=task.VFPinternal*VFPInfoXEffect;

if task.VFPinternal>1.0, then task.VFPinternal=1.0;

The value of VFPInfoXEffect is retrieved from the following matrices. VFP updating is dynamic, i.e., it happens whenever an information exchange finishes. You can disable the effects by setting matrix values to 1.0.

ParticipantNonAttendanceFailureEffect

This matrix defines the weight for updating participant verification failure probabilities (Internal and External) due to not attending to information exchange with peers, meetings and noise respectively.

NOTE: Weight=1.0 implies no effect of ignoring communications, meetings or noise. See table 14.
  Row=Non-attended Info Exchange type
  Column=Level of formalization

TABLE 14

|  | High | Medium | Low |
| --- | --- | --- | --- |
| InfoXNonAttend | n | n | n |
| MeetNonAttend | n | n | n |
| NoiseNonAttend | n | n | n |

ParticipantAttendanceFailureEffect

This matrix defines the weight for updating participant verification failure probability due to attending to information exchange from peers, meetings and noise respectively. See table 15.
  Row=InfoExchange type
  Column=Level of formalization

TABLE 15

|  | High | Medium | Low |
| --- | --- | --- | --- |
| InfoXAttend | n | n | n |
| MeetAttend | n | n | n |
| NoiseAttend | n | n | n |

Impact of Participant Decision-Making Behavior on the VFP

Vité simulates the impact of participant information exchange behavior by updating VFP based on the effect weight as shown below (same for VFPexternal):

task.VFPinternal=task.VFPinternal*VFPInfoXEffect;

if task.VFPinternal>1.0, then task.VFPinternal=1.0

The value of VFPInfoXEffect is retrieved from the following matrices, based on decision-maker's role and the type of decision it has made. VFP updating is dynamic, i.e., it happens whenever a decision is made. You can turn off the effects by setting values of the matrices to 1.0. See table 16.

LowCentralDecisionWeight

Matrix used for Low centralization:
   Row=Decision-maker's role.
   Column=Type of decision made.
   Values=VFPInfoXEffect for updating VFP

TABLE 16

|    | Rework | Quick-Fix | Ignore |
| --- | --- | --- | --- |
| PM | n | n | n |
| SL | n | n | n |
| ST | n | n | n |

MediumCentralDecisionWeight

Matrix used for Medium centralization (See table 17):
   Row=Decision-maker's role.
   Column=Type of decision made.
   Values=VFPInfoXEffect for updating VFP

TABLE 17

|    | Rework | Quick-Fix | Ignore |
| --- | --- | --- | --- |
| PM | n | n | n |
| SL | n | n | n |
| ST | n | n | n |

HighCentralDecisionWeight

Matrix used for High centralization (See table 18):
   Row=Decision-maker's role.
   Column=Type of decision made.
   Values=VFPInfoXEffect for updating VFP

TABLE 18

|    | Rework | Quick-Fix | Ignore |
| --- | --- | --- | --- |
| PM | n | n | n |
| SL | n | n | n |
| ST | n | n | n |

Implementing Decision Making Policies

Following matrices are used to implement Project Decision Making Policies, including how to determine to whom to report an exception, how to make a decision for an exception, what is the maximum time a participant will wait before it takes delegation by default.

TimeToWaitForDecision

This matrix defines how long a participant should wait for a decision before it assumes delegation by default.

Participants with different roles in the organization may have different time-out durations. See table 19.

TABLE 19

| Participant roles | Time-out duration in minutes |
| --- | --- |
| PM | n |
| SL | n |
| ST | n |

DecisionMakerPolicy

This matrix is used by a participant to determine who should make the decision for an exception, based on the project's centralization policy. The assumption is that more centralized project teams require higher level participants make decisions for exceptions. See table 20.
   Row=Decision maker's role
   Column=Level of centralization
   Values=Probability a certain role should make the decision.

TABLE 20

|    | High | Medium | Low |
| --- | --- | --- | --- |
| PM | n | n | n |
| SL | n | n | n |
| ST | n | n | n |

DecisionChoicePolicy

This matrix is used by a decision-maker to determine how an exception should be dealt with, based on project's centralization policy. NOTE: The assumption is that higher level participants (e.g., project managers) tend to make more Rework decisions. Vité experience has found this assumption reasonable for routine engineering design. However, for domains like software engineering, Vité staff has found that the reverse is true. Participants (hackers) want to fix every known bug, whereas managers want to ship on time, even with known, non-serious bugs. This matrix should be adjusted to reflect the "bug fixing" culture of the organization being modeled. See table 21.
   Row=Decision-maker's role
   Column=Decision type
   Values=Probability the decision-maker will make a certain type of decision

TABLE 21

|    | Rework | Quick-Fix | Ignore |
| --- | --- | --- | --- |
| PM | n | n | n |
| SL | n | n | n |
| ST | n | n | n |

Information Exchange Probability Adjustment

The following matrices adjust the frequency probability of different types of information exchange based on the Level of project Formalization:

AdjustedInfoXProbability=OriginalCommunicationProbability* AdjustFactor;

The Info Exchange AdjustFactor is retrieved from the following matrix given the level of formalization.

NOTE: Meeting frequency is not adjustable in VitéProject 2.2, so the Meet row of the matrices is not meaningful.

CoordinationDistribution

This matrix defines the VFP adjustment factor for different types of information exchange. See table 22.
   Row=Information exchange type
   Column=Level of formalization
   Values=Info Exchange AdjustFactor.

TABLE 22

|  | High | Medium | Low |
|---|---|---|---|
| InfoExchange | n | n | n |
| Meeting | n | n | n |
| Noise | n | n | n |

CoordinationPriority

When a participant picks up an information exchange item, it has to decide whether to attend the request for information exchange. This matrix defines the chance a participant attends to a given type of information exchange given a level of strength of organization matrix. e.g., if Matrix Strength is High (as in a Project organization), then a participant will probabilistically attend to n % of information exchanges, and n % of the meetings and n % of the Noise. Project organizations have high Matrix strength; functional teams have low matrix strength. See table 23.

Row=Type of information exchange
Column=Matrix Strength
Values=Probability a participant will attend a communication.

TABLE 23

|  | High | Medium | Low |
|---|---|---|---|
| InfoExchange | n | n | n |
| Meeting | n | n | n |
| Noise | n | n | n |

Communications-Related Matrices

ToolTimeToDeliver

This matrix defines the length of time (in minutes) it takes to deliver messages using different communication tools. See table 24.

TABLE 24

| Communication tool | Message length (minutes) |
|---|---|
| Conversation | n |
| Email | n |
| Fax | n |
| Memo | n |
| Phone | N |
| Video Conference | N |
| Voice Mail | n |

ToolTimeToExpire

This matrix defines the length of time (in minutes) it takes for messages to expire in the recipients in-tray. See table 25.

TABLE 25

| Communication tool | Time to expire (minutes) |
|---|---|
| Conversation | N |
| Email | n |
| Fax | n |
| Memo | n |
| Phone | n |
| Video Conference | n |
| Voice Mail | n |

MessageVolume

This matrix defines the volume (in minutes) for each type of message. See table 26.

Row=Recipients role
Column=Message type

TABLE 26

|  | Decision | Exception | InfoExchange | Meeting | noise |
|---|---|---|---|---|---|
| PM | n | n | n | 0 | n |
| SL | n | n | n | 0 | n |
| ST | n | n | n | 0 | n |

Figure 26:
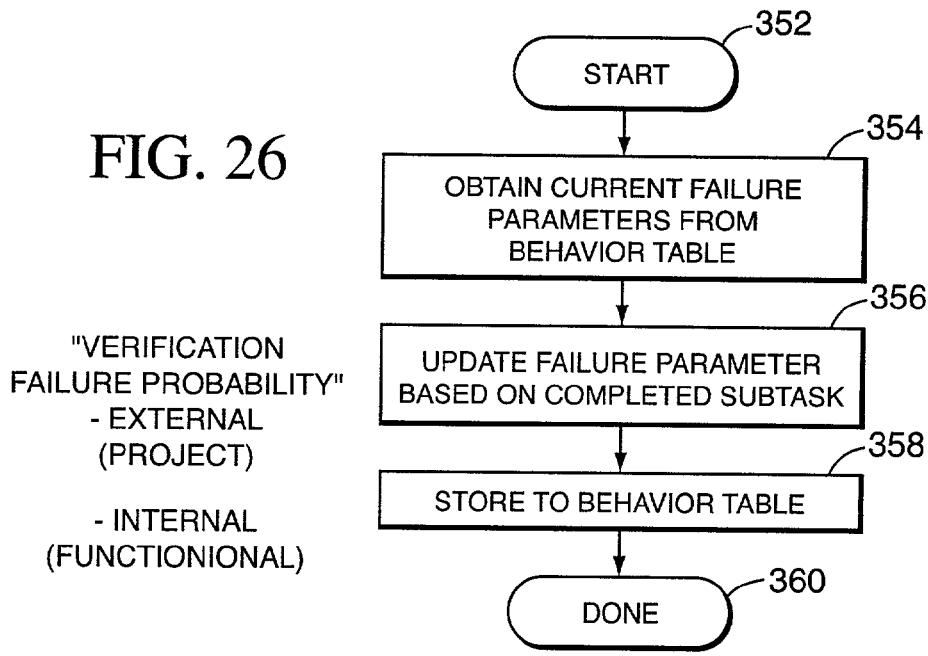
FIG. 26 is a flow diagram illustrating a verification failure probability (VFP) process of the present invention.

FIG. 26 is a flow diagram illustrating a verification failure probability (VFP) process of the present invention. VFP is the probability that an exception will be generated for a task. The VFP is calculated during simulation based on a number of factors, including task complexity. A task has an initial probability of functional or project failure which initiates the project exception handler. The initial probability is adjusted up or down depending upon the performance of the system. If the responsible parties do not attend their meetings, for example, the failure probability will go up. Similarly, if exceptions are ignored, the probability of failure will also go up. The actions of the responsible parties affect future task completion. This dependency can go across projects. Every time a subtask is completed, a check is made for functional and project failure and the VFP is updated accordingly.

The process starts at 352. At operation 354, the current failure parameters are obtained from the behavior file. In operation 356, the failure parameters are updated based on a completed subtask. Operation 358 stores the updated failure parameters to the behavior file. The VFP process then ends with operation 360.

Figure 27:
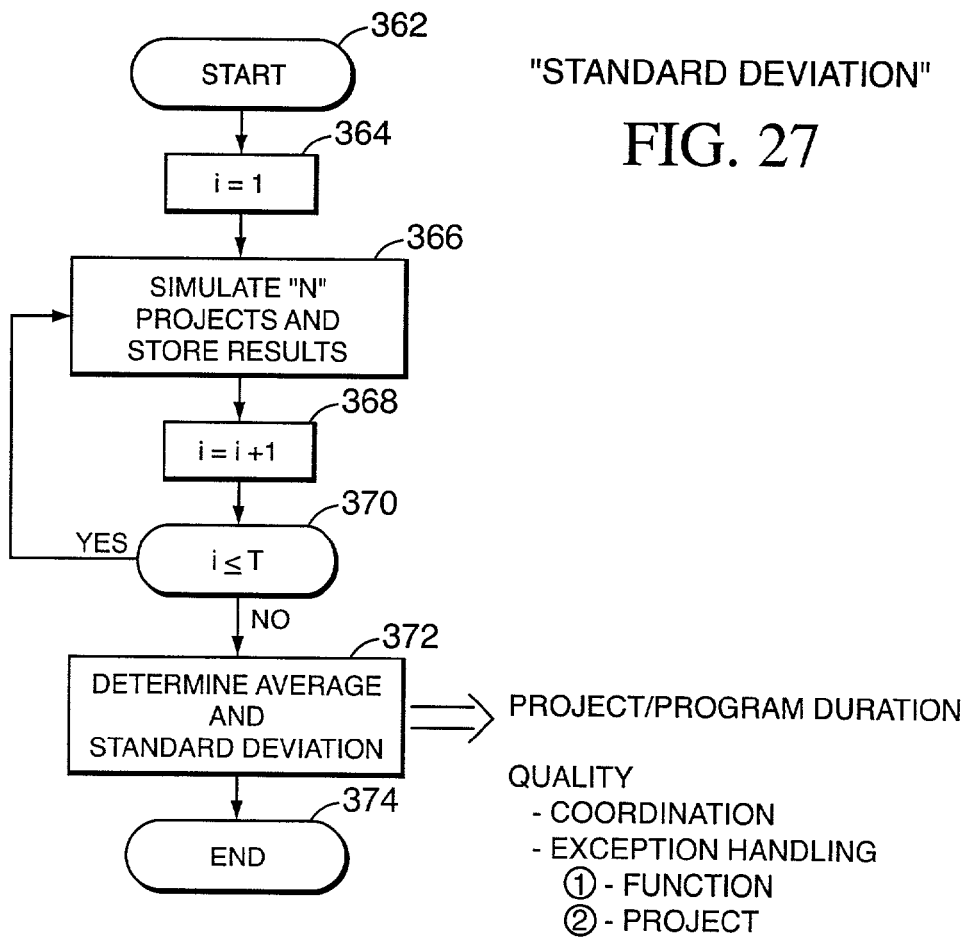
FIG. 27 is a flow diagram illustrating a standard deviation calculation process in accordance with the present invention.

FIG. 27 is a flow diagram illustrating a standard deviation calculation process in accordance with the present invention. One or more projects are simulated concurrently for a number of times, set at the program parameter level. As each simulation occurs, various probabilistic calculations are made which result in an average and standard deviation values for a multitude of project parameters. The standard deviation calculation process begins with operation 362 and then proceeds to operation 364, where a variable is set to 1. Control is then passed to operation 366 and the project(s) are simulated and the results are stored. After operation 366 is completed, control goes to operation 368 where the variable is incremented to keep track of the number of simulations that has occurred. The variable is then checked against the total number of required simulations at decision point 370. If the variable is still less than the total number of required simulations, control is passed back to operation 366. This loop will keep occurring until all of the required simulations have been completed. At operation 372, the averages and standard deviations are determined. The standard deviation calculation process then ends at operation 374. The standard deviation values can give an indication of variance in the project/program duration, costs and quality.

FIG. 27A is an exemplary output of the standard deviation calculation process of FIG. 27. Chart 376 shows an example project summary statistics chart. Chart 378 shows an example project communications risk chart.

Figure 27B:
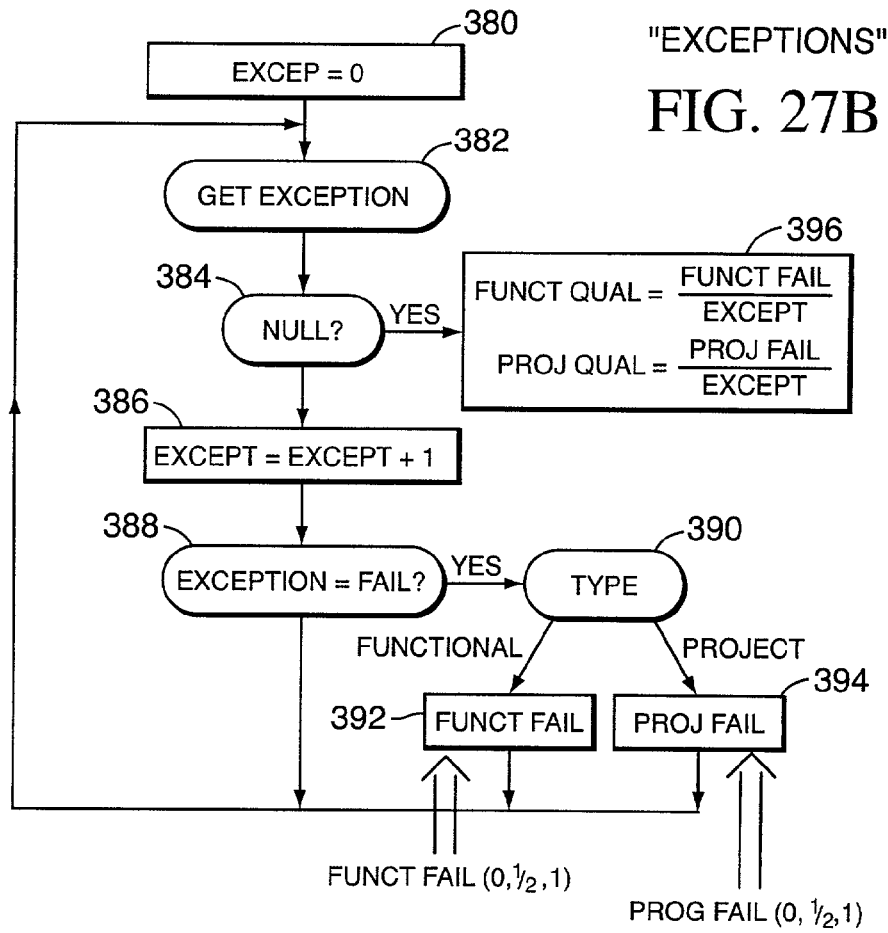
FIG. 27B is a flow diagram illustrating the exception handling process.

FIG. 27B is a flow diagram illustrating the exception handling process. Specifically a measure of the number of functional quality exceptions and project quality exceptions is calculated. In operation 380, the number of exceptions is set to zero. In operation 382, an exception is obtained. Operation 384 performs a null test. If the null test is negative, control is passed to operation 386 where the number of exceptions is incremented. Operation 388 determines if the current exception has resulted in a subtask interruption. If yes, operation 390 determines if current exception is a functional or project exception and assigns a value to either FUNCTFAIL in operation 392 or PROJFAIL in operation 394. Control is then passed back to operation 382. If operation 388 determined that the exception did not result in a subtask completion interruption, control is passed back to operation 382. Once operation 384 results in an affirmative null test, operation 396 is performed wherein the variables FUNTFAIL and PROJFAIL are calculated.

Figure 27C:
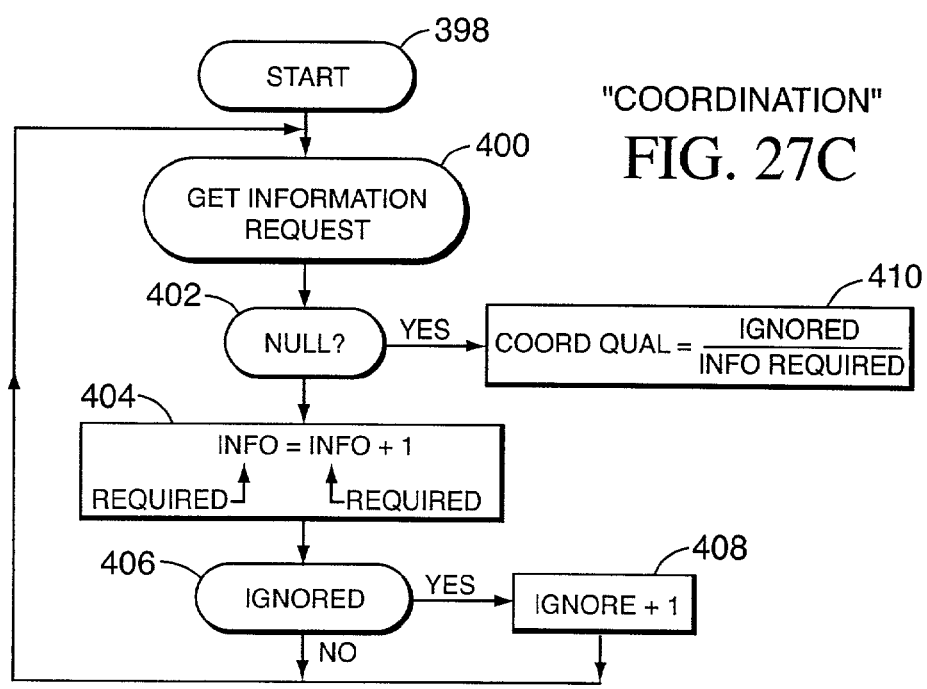
FIG. 27C is a flow diagram illustrating the coordination process.

FIG. 27C is a flow diagram illustrating the coordination process. Coordination is a combination of the information exchange generated by communications and meetings. Operation 398 starts the coordination process. Operation 400 obtains an information request. Operation 402 performs a null test. If it is negative, a variable INFO is incremented by 1 in operation 404. Decision operation 406 determines if the information request was ignored. If it was, the IGNORE variable is incremented by 1 in operation 408. Control is then returned to operation 400 after operation 408 is performed or if the information request in operation 406 was not ignored. The loop will perpetuate until all the information requests have been cycled through which results in an affirmative null test at operation 402. Operation 410 then calculates a measure of quality of the coordination process based upon the IGNORED and INFO variables.

FIG. 28 is an example of a parameter lock process of the present invention. Parameter locking is a way for a project manager to exert some control over a project. For example, the length of a work day can be locked and the effects that has on a project or program of projects can be seen. Open lock 412 shows an example of a parameter that has not been locked. Closed lock 414 indicates a parameter that has been locked.

Figure 29:
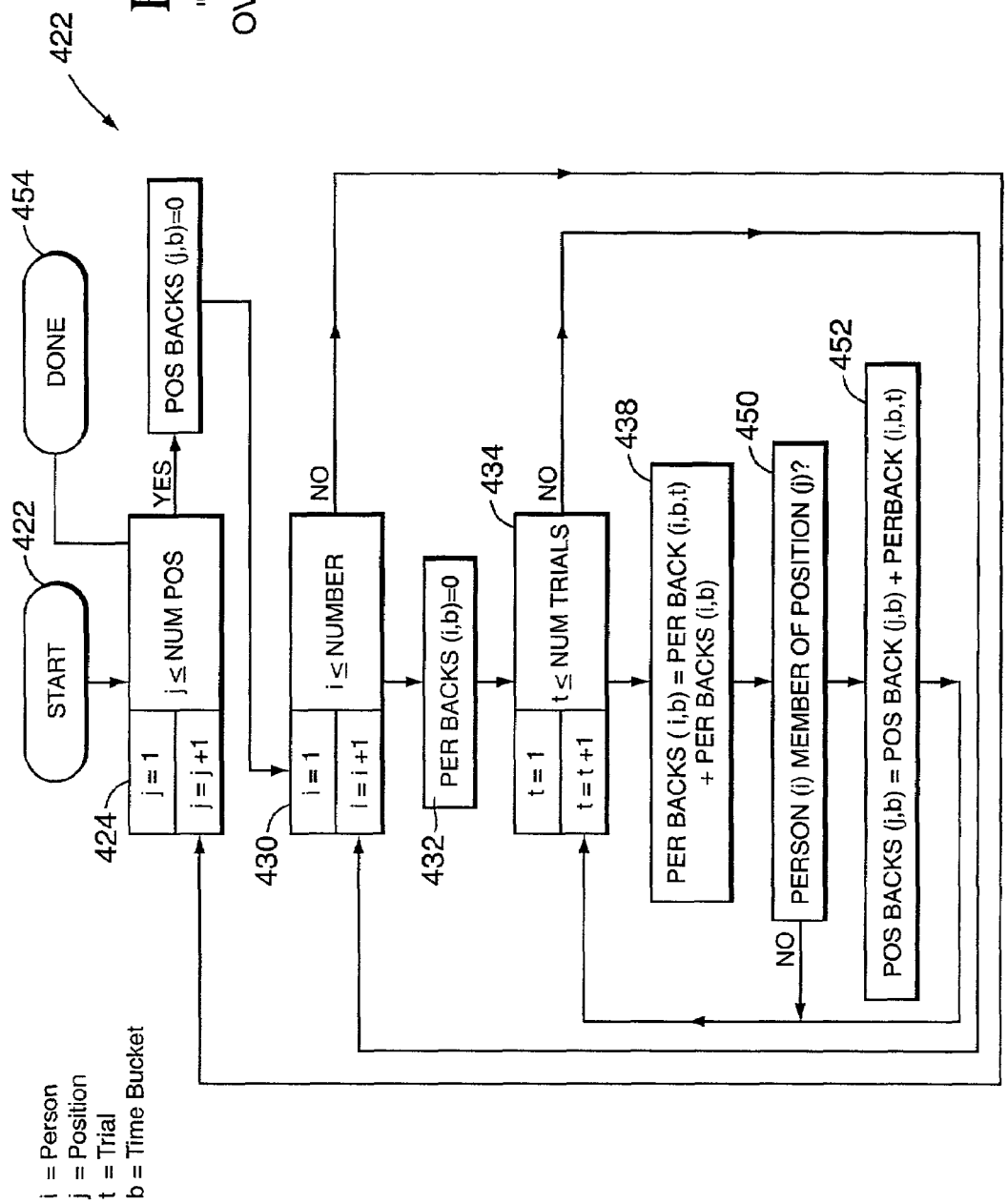
FIG. 29 is a flow diagram illustrating a process for determining a person backlog.

FIG. 29 is a flow diagram illustrating a process for determining a person backlog. A person backlog is based on how deep and how old a task queue is. Each person, position and department has a queue. The units of the person backlog are working-days. If one task is 1 day overdue and a second task is 30 days overdue, then the person backlog is 31 working-days. While the person backlog for a project or department may look fine, it is possible for a particular individual to have a large person backlog. The process for determining a person backlog is determined by setting each individual's initial backlog to zero and obtaining an average backlog over a series of trials/simulations. For each time bucket b, there is an average by person and position across a number of trials.

More particularly, the "Average over Trial" process 420 starts at 422 and then begins iterative loop 424. If the variable j is less than or equal to the number of positions NUMPOS, operation 426 initializes the position backlog sum array element POSBACKS(j,b) to zero. Next, in operation 430, if the variable i is less than or equal to the number of persons NUMPER, operation 432 initializes the person backlog sum array element PERBACKS(i,b) to zero. Operation 434 starts an iteration loop on the number of trials t. Operation 438 increments the person array element PERBACKS(i,j,b) by PERBACK(i,b,t). Next, Operation 450 tests whether person i is a member of position j; if so, operation 452 increments the position array element POSBACKS(j,b) by PERBACK(i,b,t) and returns to iteration loop 434. If not, control returns directly to loop 434. The middle iterative loop 430 is iterated until i is greater than NUMPER, at which time the outer iterative loop 424 is iterated until j is greater than NUMPOS. When the outer iterative loop 424 is completed, the process 420 is done at 454.

Figure 30:
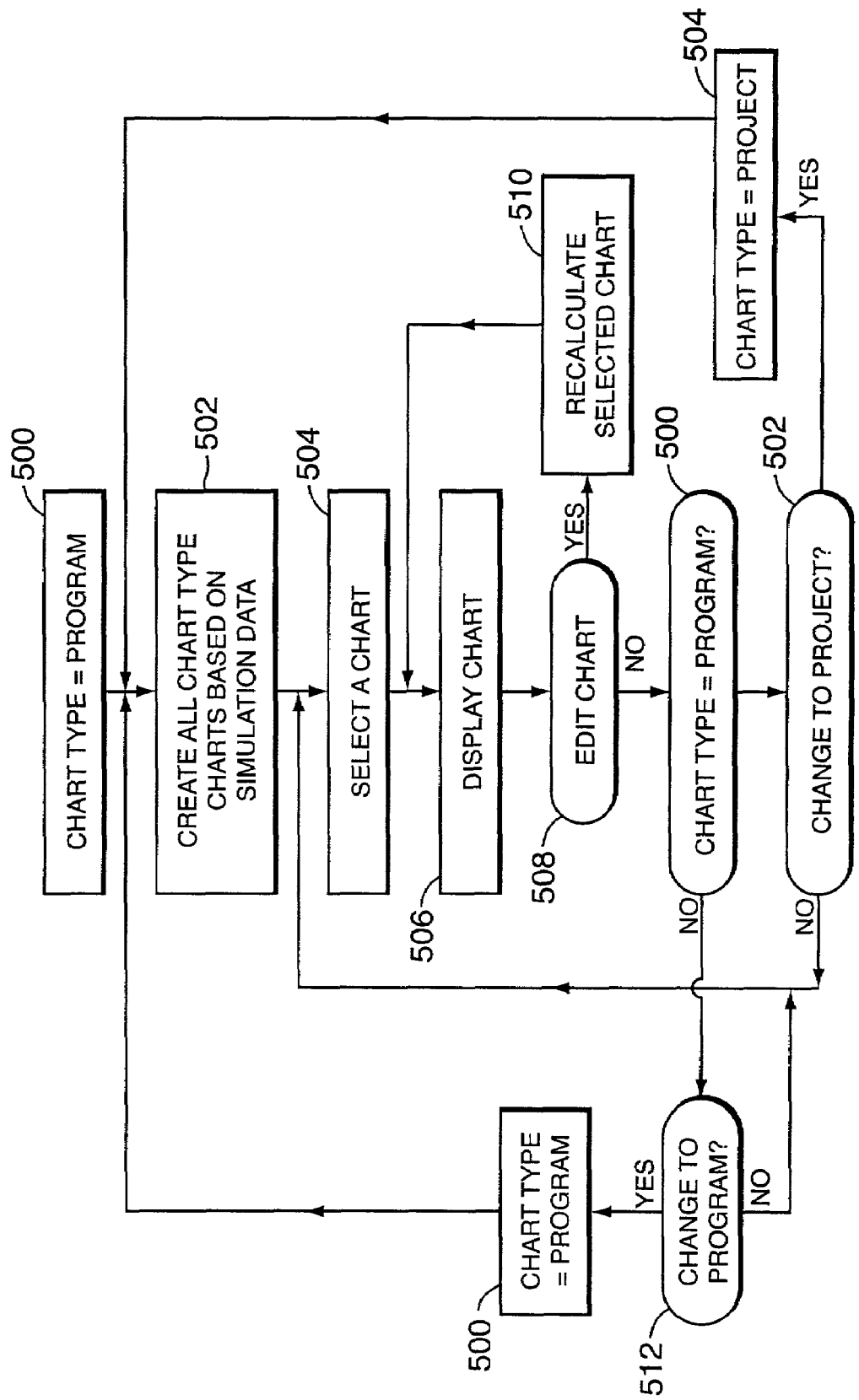
FIG. 30 is a flow diagram illustrating the display results operation of FIG. 22.

FIG. 30 is a flow diagram illustrating the display results operation 264 of FIG. 22. Operation 500 selects the program charts. Operation 502 creates all of the program related charts based on the simulation data. Operation 504 allows for the selection of a particular chart. The selected chart is then displayed via operation 506. The displayed chart can then be edited during operation 508. Operation 510 recalculates the chart based upon the edits and control is transferred to operation 506—display chart. Optionally, the displayed chart could not be edited and control goes to operations 500 and 502 to allow for continued viewing and editing of program chart types or the project chart types can be selected. Operation 504 changes the chart type to project and all of the project charts are created in operation 502. The project charts can also be selected, displayed and edited in the same manner as the program charts.

Figure 31:
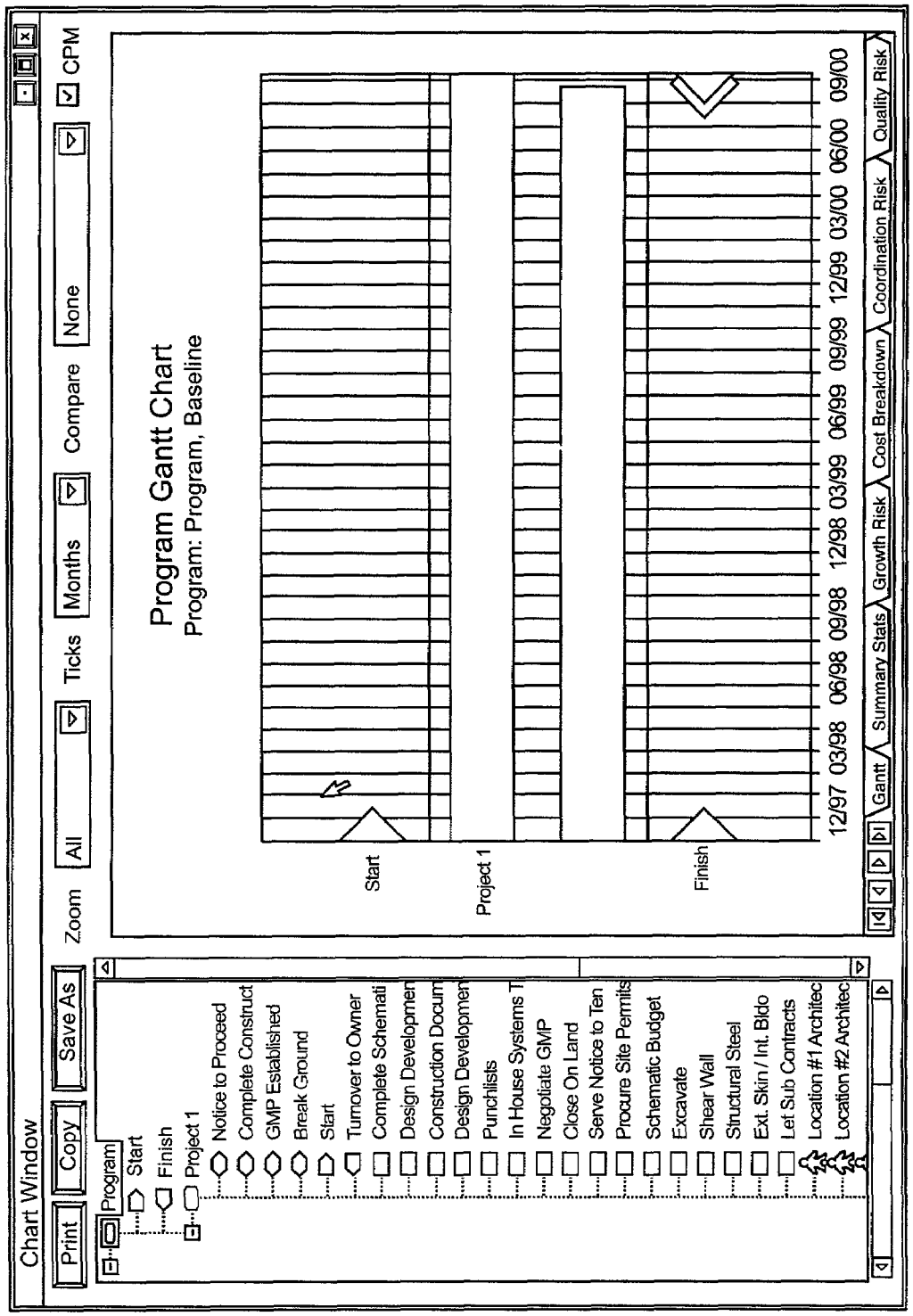
FIG. 31 is an illustration of a program default chart of the present invention.

FIG. 31 is an illustration of a multi-project program default Gantt chart of the present invention. Program Gantt chart 514 can be used to show a predicted project completion date, show critical path method (CPM) non-critical projects that become critical due to coordination due to coordination overload and to evaluate the model's validity.

Figure 32:
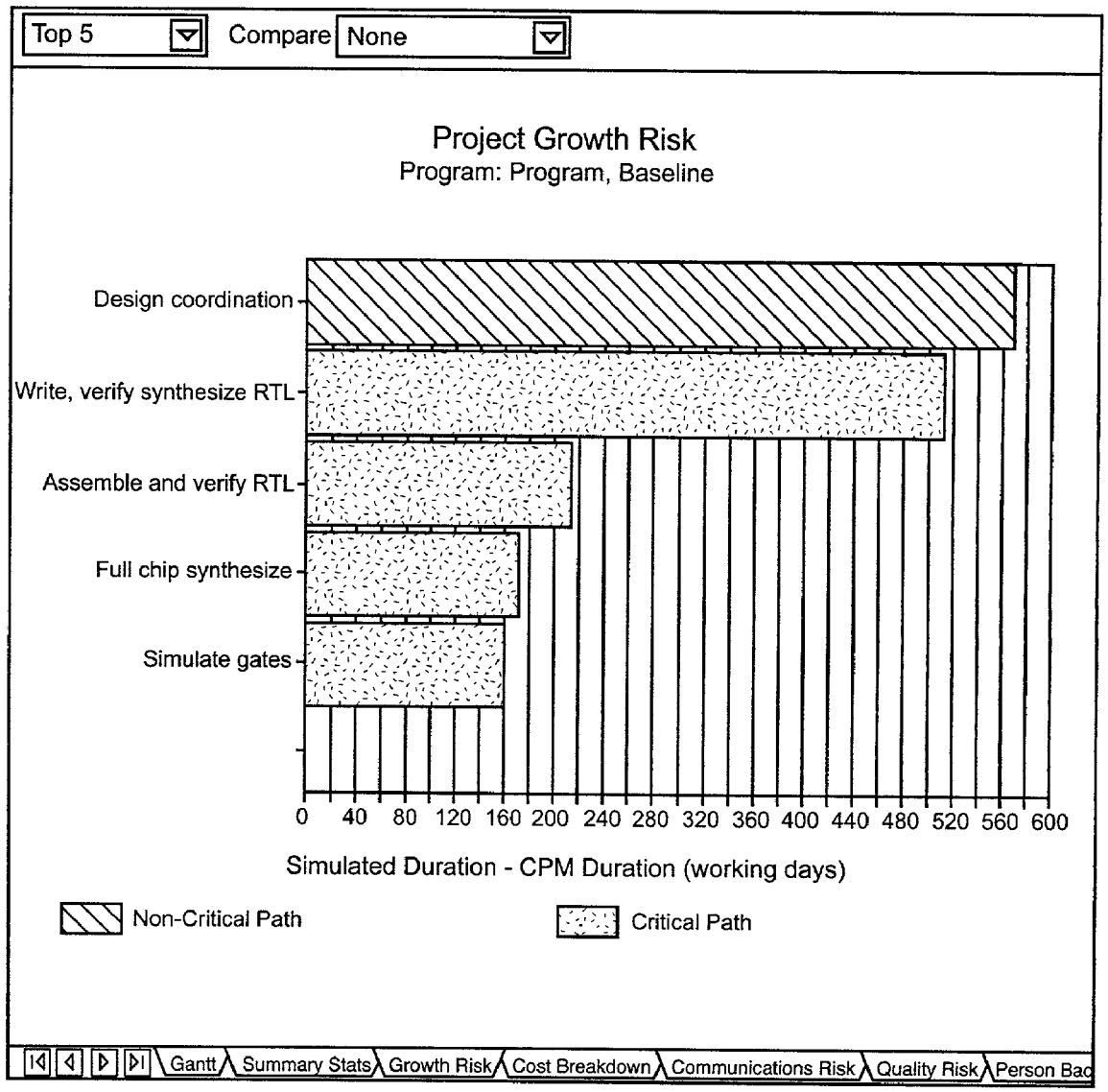
FIG. 32 is an illustration of a growth risk chart of the present invention.

FIG. 32 is an illustration of a growth risk chart of the present invention. Project Growth Risk Chart 516 shows the tasks at greatest risk of taking longer than planned. The growth risk is calculated as the difference between CPM and simulated task durations, that is, the number of days a task (or project) takes when simulated minus the days the task (or project) takes in CPM calculation. Growth risk measures the potential growth in task duration (not the actual task duration) in terms of working days. Task growth reflects the amount of indirect work that has been added to the task through communication, rework, and wait time and properly accounts for resource allocations.

Figure 33:
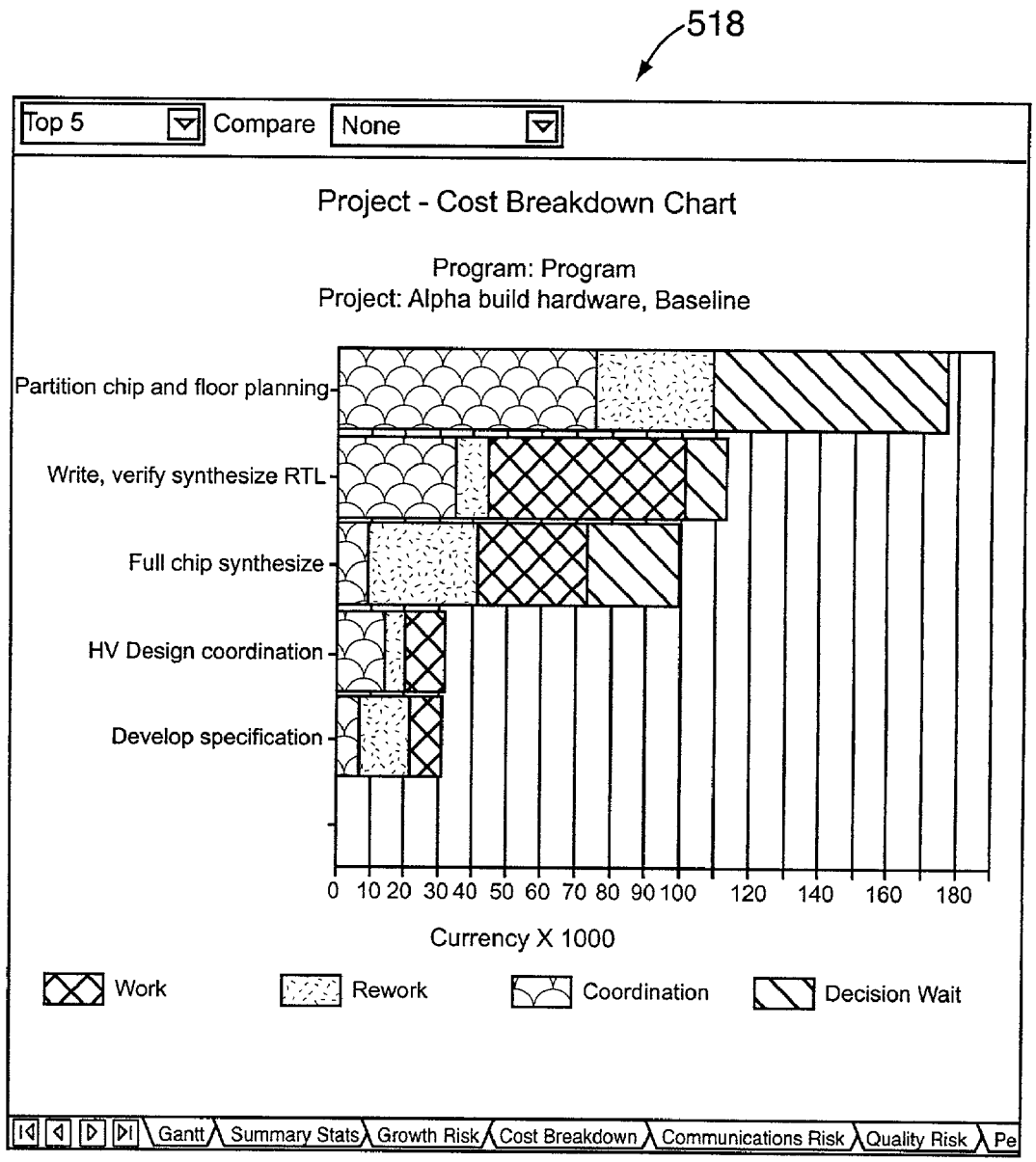
FIG. 33 is an illustration of a cost breakdown chart of the present invention.

FIG. 33 is an illustration of a cost breakdown chart of the present invention. Project Growth Breakdown Chart 518 shows the simulated detailed cost breakdown for tasks, including direct work, rework, coordination and decision wait time. This is an important chart to examine because it can give an indication about the indirect work involved in high-risk tasks.

Figure 34:
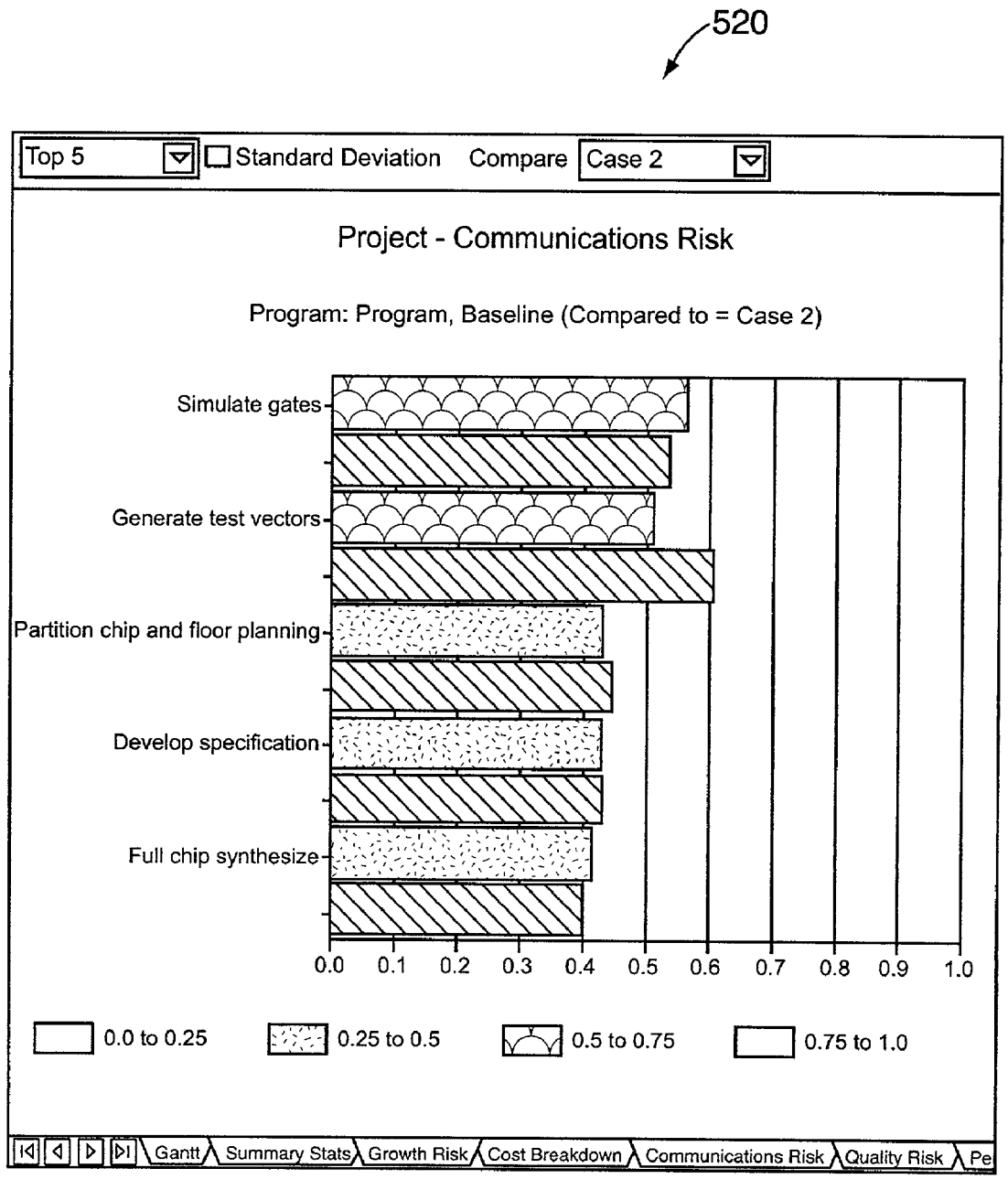
FIG. 34 is an illustration of a communication risk chart of the present invention.

FIG. 34 is an illustration of a communication risk chart of the present invention. The Project Communication Risk chart 520 measures the risk that positions will handle communications improperly. This process risk suggests possible product quality risk. The chart shows by default the top five tasks that pose a communication risk to the project.

Figure 35:
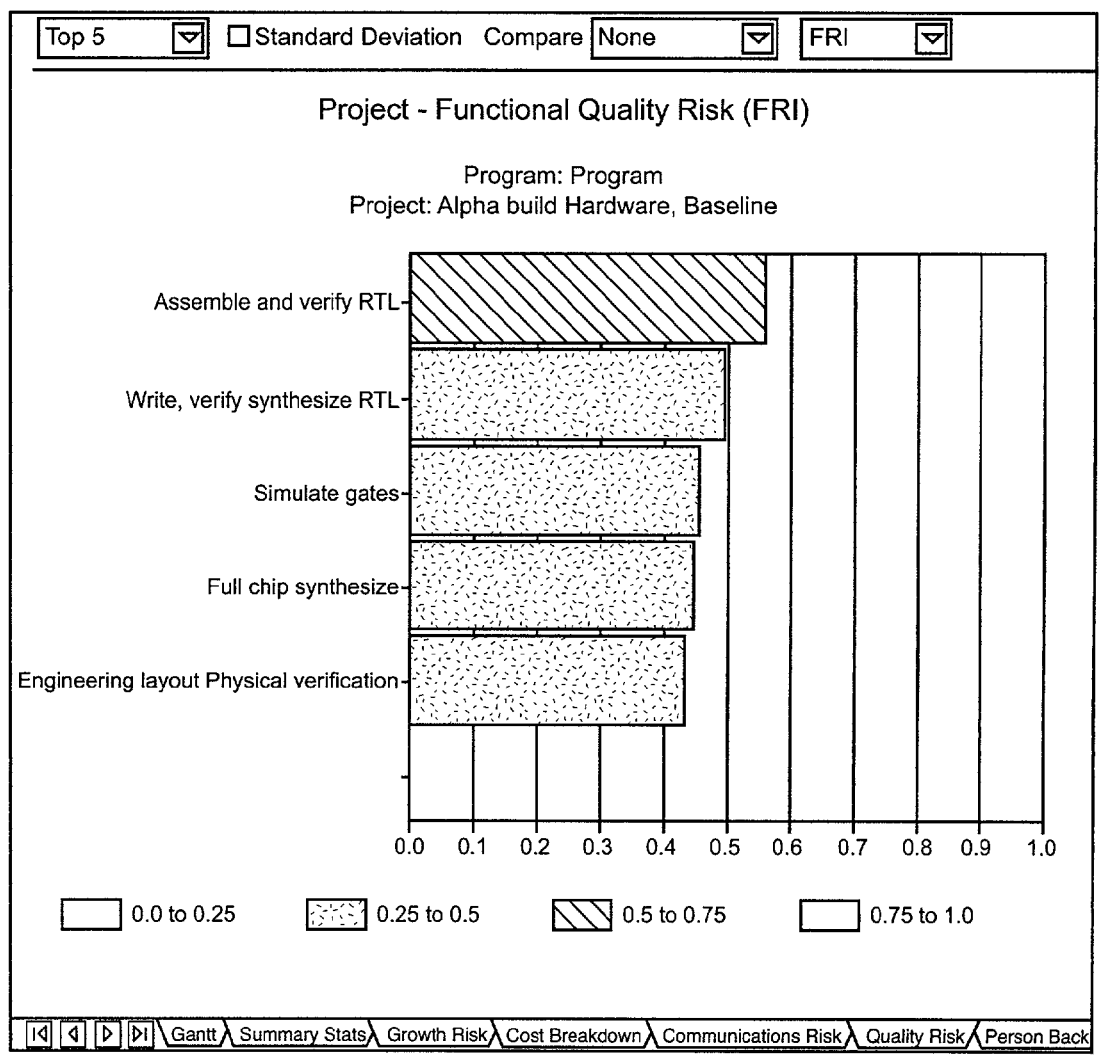
FIG. 35 is an illustration of a functional quality risk chart of the present invention.

FIG. 35 is an illustration of a functional quality risk chart of the present invention. The Quality Risk chart 522 shows the tasks that pose the greatest risk to the quality of the product because they have the greatest risk of exception-handling failures.

Figure 36:
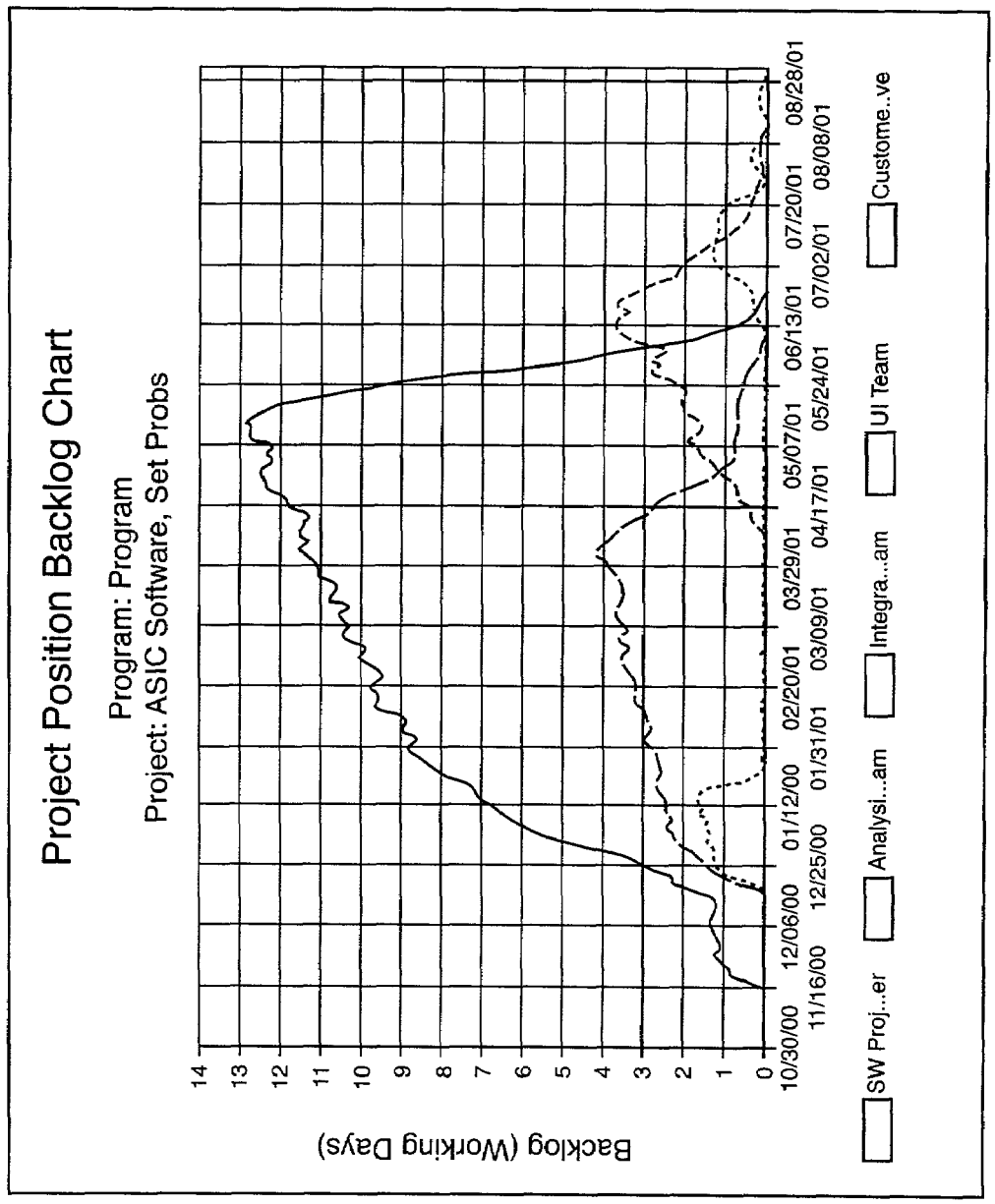
FIG. 36 is an illustration of a position backlog chart of the present invention.

FIG. 36 is an illustration of a position backlog chart of the present invention. The Project Position Backlog chart 524 shows overloads on person in a project over time. It can also help to understand the root cause of backlogs by identifying periods in which backlogs occur.

Figure 37:
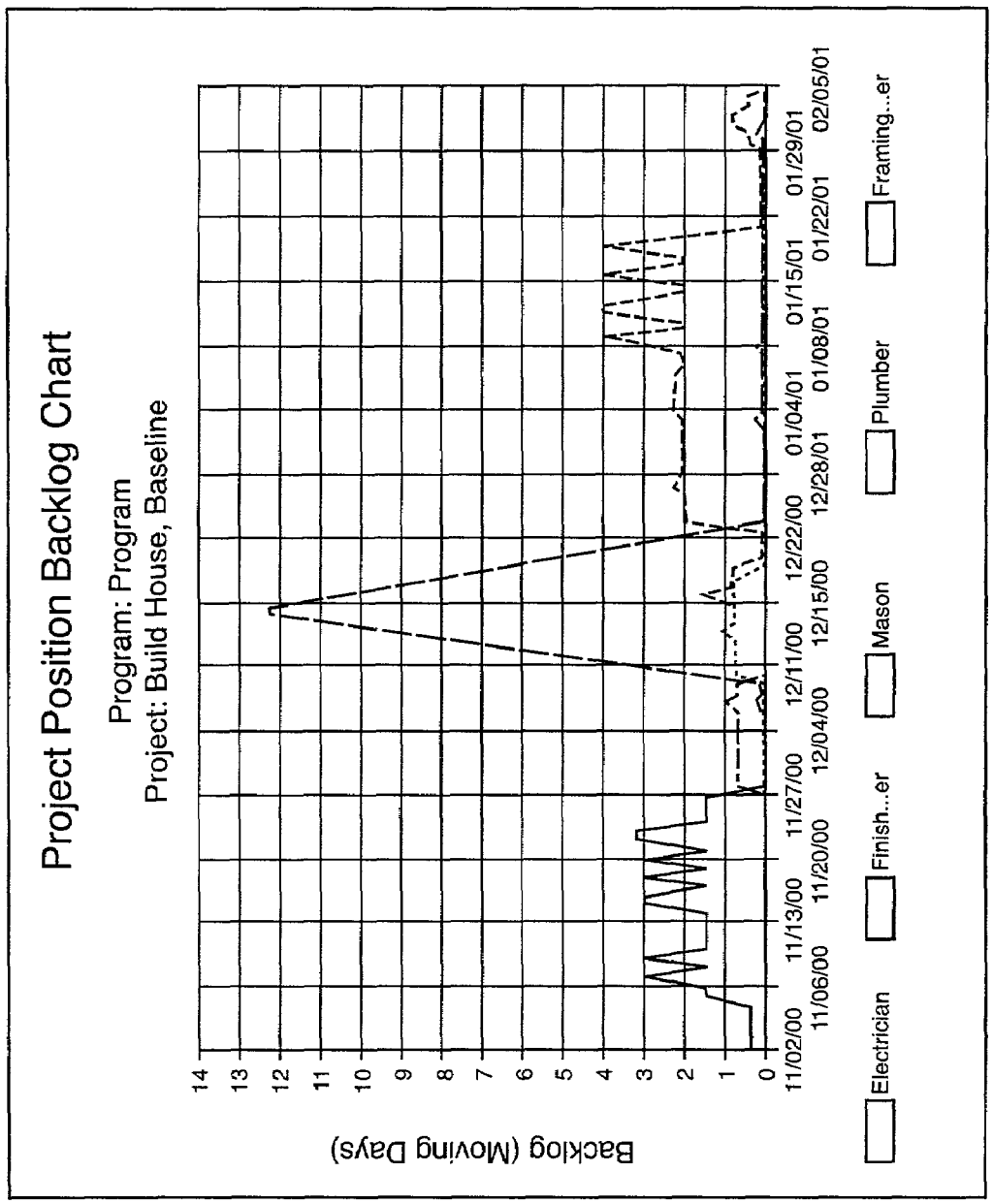
FIG. 37 is an illustration of a position backlog chart of the present invention.

FIG. 37 is an illustration of a position backlog chart 526 of the present invention. If a person is highly backlogged, but the staffed position is not as backlogged, then the person must be responsible for another task, possibly in another project, and the two projects are competing for the resource. The overloaded person could cause problems in both tasks.

FIG. 38 is an example of a meetings table 528 of the present invention. An important feature of the meetings table 528 is the meetings risk 530. Meeting Risk is calculated as the number of meetings missed divided by the number of meetings requested. Each time a person misses a meeting, it counts as one meeting missed. For example, if two meetings are scheduled for four persons each, and one person misses one meeting, then the meeting risk is ⅛=0.125.

It will be appreciated by one skilled in the art that a multiple project management system includes a program object and wherein each project includes a plurality of tasks which can have multiple interdependencies, a plurality of project objects inheriting from the program object, an organizational structure and a simulator which simulates a program using the plurality of project objects and the organizational structure.

Also, the organizational structure includes a plurality of department objects inheriting from the program object. The organizational structure is a matrix organizational structure. Also, the matrix organizational structure is a two dimensional matrix organizational structure.

Additionally, a simulator evokes a sequence of tasks of the project objects. The evocation of the sequence of tasks involves the evocation of a sequence of sub-tasks. The evocation of each sub-task includes the handling of exceptions developed by the sub-task. Also, evocation of the sub-tasks provides data for verification failure probability (VFP). The evocation of the sub-tasks can also provide data for standard deviation analysis.

Furthermore, properties of the program objects are stored in behavior files, as are global parameters that affect the operation of the simulator. Advantageously, global parameter locks can prevent the global parameters from being changed.

Also, a charter can be operative to chart results produced by the simulator. A filter can filter the results of the simulator prior to passing the filtered results to the charter. The simulator can also include a cost breakdown module. The simulator also may include a backlog module. The backlog module includes a person backlog component and a position backlog component.

In yet another embodiment of the present invention, a project management system for matrix organizations includes a program object, a matrix organization structure a project structure and a simulator, which simulates a program using the department structure and the project structure.

Also, the matrix organization structure includes a plurality of department objects inherited from the program object. The project structure also includes a plurality of project objects inherited from the program object.

Additionally, a simulator includes exception handling. The project object can have parameters stored in behavior files. The matrix structure is two-dimensional. Also, the matrix structure can be at least three-dimensional.

The simulator can also include a backlog module and the backlog module can include a person component and a position component.

While this invention has been described in terms certain preferred embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A computer program product comprising a tangible computer readable medium including computer executable instructions, embedded in the medium, for managing multiple projects, the instructions comprising instructions for:
    initiating a program including a plurality of projects and an organization having an organizational structure and wherein each project includes a plurality of tasks having multiple interdependencies;
    at least one of creating and editing at least one of projects and said organization;
    simulating said program utilizing said plurality of projects and said organization; and
    display results of said simulating;
    wherein simulating said program includes:
        evoking a start milestone having a successor;
        iteratively evoking a successor which iteratively evokes a subtask; and
        completing the simulation with an end milestone having no successor.

2. A computer program product as recited in claim 1 wherein said organization includes a plurality of departments.

3. A computer program product as recited in claim 1 wherein said organization is organized as a matrix organization.

4. A computer program product as recited in claim 3 wherein said matrix organization has at least one functional manager and at least one project manager.

5. A computer program product as recited in claim 1 further comprising at least one of creating and editing program parameters which affect said simulating.

6. A computer program product as recited in claim 1 wherein initiating a program includes at least one of retrieving a stored program and creating a new program.

7. A computer program product as recited in claim 6 wherein creating a new program includes retrieving a program template.

8. A computer program product as recited in claim 1 wherein editing a project includes at least one of adding and deleting at least one of tasks, positions, successors, milestones, meetings, and connectors.

9. A computer program product as recited in claim 8 wherein editing a project further includes adding at least one of a task coordination, rework and task assignment.

10. A computer program product as recited in claim 1 wherein editing an organization includes at least one of defining a department and defining a link.

11. A computer program product as recited in claim 10 wherein for each subtask that is evoked, exceptions are handled.

12. A computer program product as recited in claim 11 wherein said exceptions include information exceptions and failure exceptions.

13. A computer program product as recited in claim 1 wherein said organizational structure includes a plurality of department objects inheriting from said program object.

14. A computer program product as recited in claim 13 wherein said organizational structure is a matrix organizational structure.

15. A computer program product as recited in claim 14 wherein said matrix organizational structure is a two-dimensional matrix organizational structure.

* * * * *